US012584803B2

(12) United States Patent　　　　(10) Patent No.:　US 12,584,803 B2
Dennett et al.　　　　　　　　　　　(45) Date of Patent:　Mar. 24, 2026

(54) METHODS OF MEASURING THERMAL PROPERTIES, AND RELATED APPARATUSES

(71) Applicant: Battelle Energy Alliance, LLC, Idaho Falls, ID (US)

(72) Inventors: Cody A. Dennett, Arlington, MA (US); Robert S. Schley, Rigby, ID (US); Yuzhou Wang, Idaho Falls, ID (US); David H. Hurley, Idaho Falls, ID (US); Geoffrey L. Beausoleil, Idaho Falls, ID (US); Daniel J. Murray, Idaho Falls, ID (US); Michael J. Moorehead, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 222 days.

(21) Appl. No.: 18/489,706

(22) Filed: Oct. 18, 2023

(65) Prior Publication Data

US 2024/0151594 A1　　May 9, 2024

Related U.S. Application Data

(60) Provisional application No. 63/379,943, filed on Oct. 18, 2022.

(51) Int. Cl.
G01K 11/125　　　(2021.01)
G01S 7/481　　　(2006.01)
(52) U.S. Cl.
CPC .......... G01K 11/125 (2013.01); G01S 7/4811 (2013.01); G01S 7/4818 (2013.01)

(58) Field of Classification Search
CPC .............................. G01K 11/125; G01S 7/481
USPC .......................................................... 374/121
See application file for complete search history.

(56) References Cited

U.S. PATENT DOCUMENTS

| | | | |
|---|---|---|---|
| 5,667,300 A | 9/1997 | Mandelis et al. | |
| 7,182,510 B2 | 2/2007 | Cahill | |
| 10,578,569 B2 * | 3/2020 | Hurley .................. | G01N 25/18 |
| 10,718,673 B2 * | 7/2020 | Fleming .............. | G01K 11/125 |
| 2002/0080850 A1 | 6/2002 | Baba | |
| 2012/0207189 A1 * | 8/2012 | Abe ....................... | G01K 11/00 |
| | | | 374/161 |
| 2021/0080415 A1 * | 3/2021 | Baba ..................... | G01N 25/18 |

OTHER PUBLICATIONS

Middlemas et al., "Determining Local Thermal Transport in a Composite Uranium-Nitride/Silicide Nuclear Fuel Using Square-Pulse Transient Thermoreflectance Technique", Journal of Nuclear Materials, vol. 528, Jan. 2020, 35 pages.

* cited by examiner

*Primary Examiner* — Peter J Macchiarolo
*Assistant Examiner* — Mireille S Sadate-Moualeu
(74) *Attorney, Agent, or Firm* — TraskBritt

(57) ABSTRACT

Embodiments disclosed herein relate to measuring thermal properties. At least one embodiment includes a method including heating a location of an object with an excitation laser beam, the excitation laser beam being a continuous-wave laser beam modulated by a square-wave modulation waveform. The method may also include measuring temperature at the location over time by measuring changes in one or more reflective properties at the location. Related apparatuses are also disclosed.

20 Claims, 11 Drawing Sheets

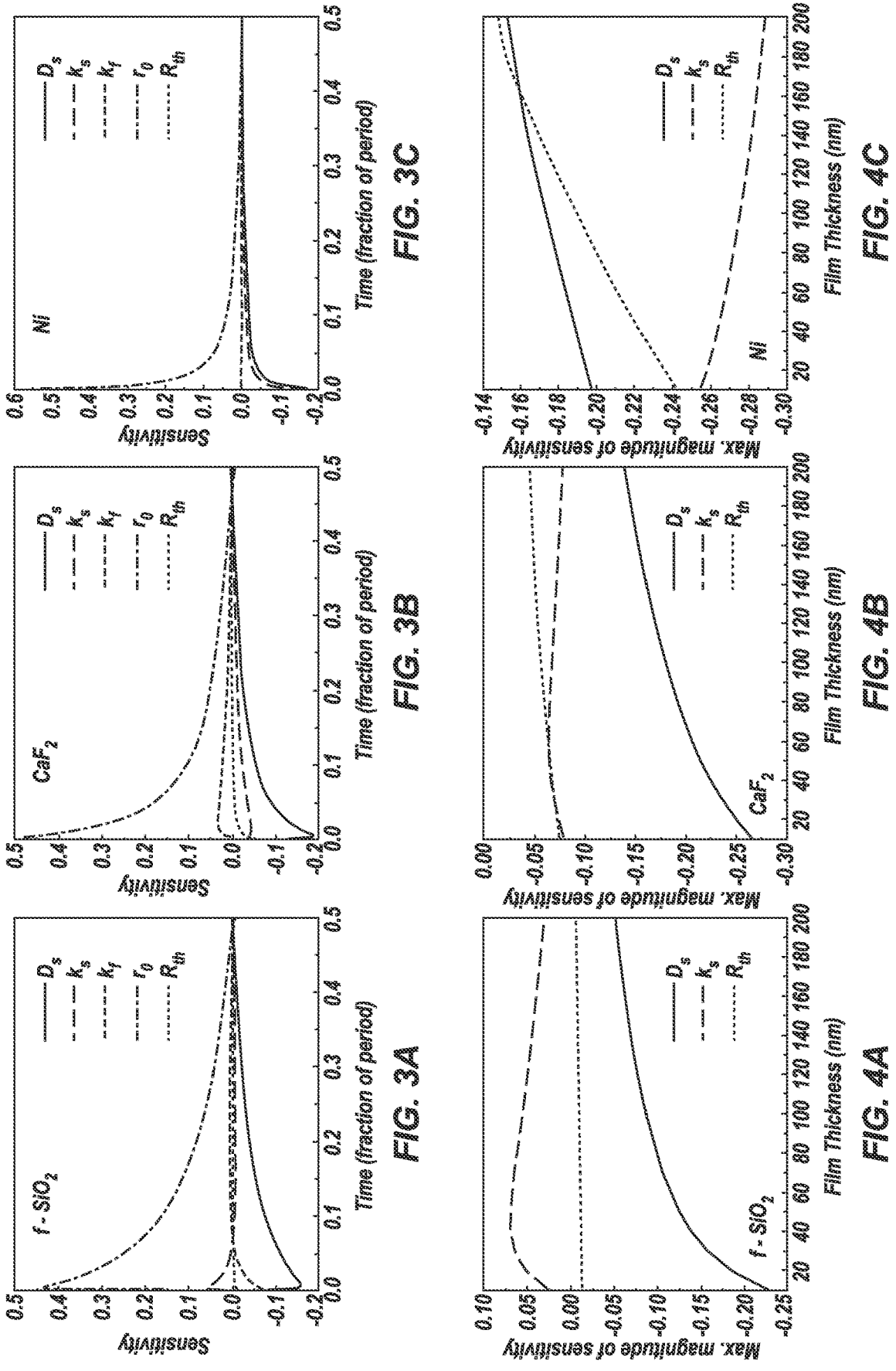

Figure 12:
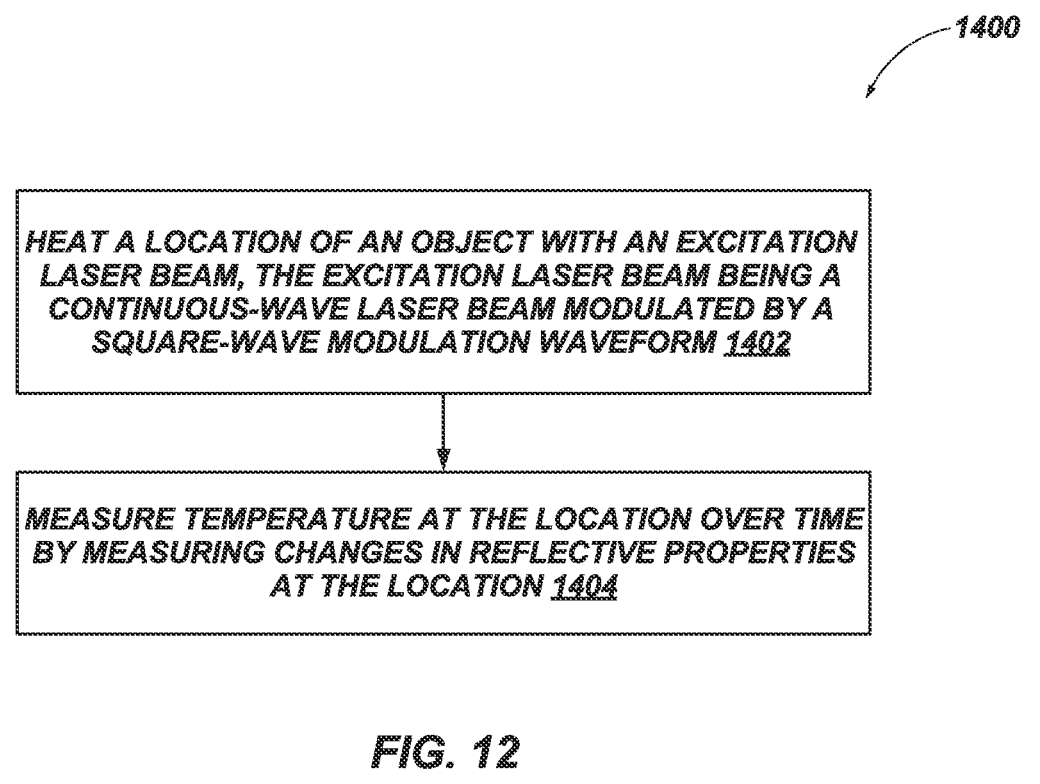

*1400*

HEAT A LOCATION OF AN OBJECT WITH AN EXCITATION LASER BEAM, THE EXCITATION LASER BEAM BEING A CONTINUOUS-WAVE LASER BEAM MODULATED BY A SQUARE-WAVE MODULATION WAVEFORM *1402*

MEASURE TEMPERATURE AT THE LOCATION OVER TIME BY MEASURING CHANGES IN REFLECTIVE PROPERTIES AT THE LOCATION *1404*

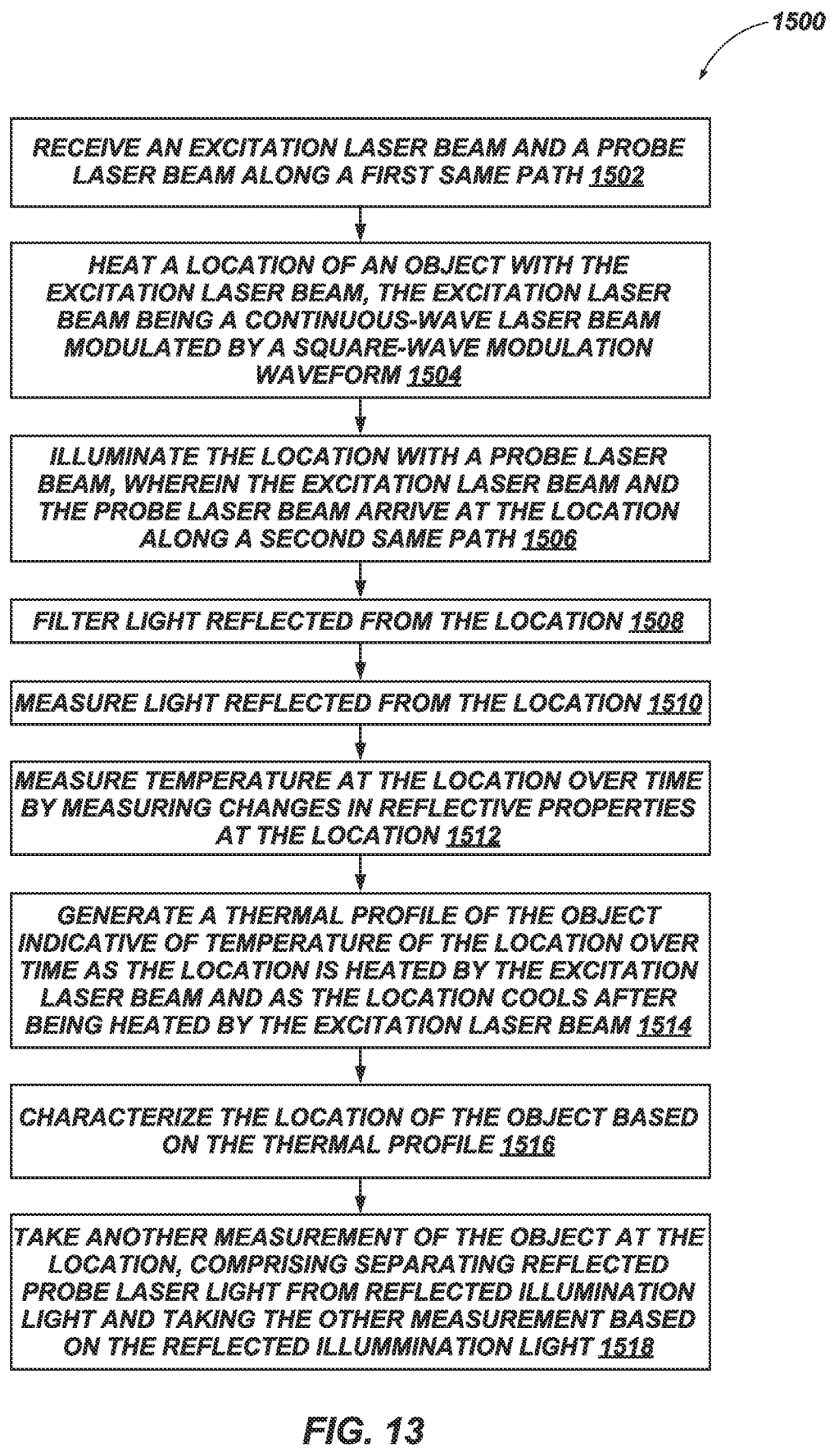

RECEIVE AN EXCITATION LASER BEAM AND A PROBE LASER BEAM ALONG A FIRST SAME PATH 1502

HEAT A LOCATION OF AN OBJECT WITH THE EXCITATION LASER BEAM, THE EXCITATION LASER BEAM BEING A CONTINUOUS-WAVE LASER BEAM MODULATED BY A SQUARE-WAVE MODULATION WAVEFORM 1504

ILLUMINATE THE LOCATION WITH A PROBE LASER BEAM, WHEREIN THE EXCITATION LASER BEAM AND THE PROBE LASER BEAM ARRIVE AT THE LOCATION ALONG A SECOND SAME PATH 1506

FILTER LIGHT REFLECTED FROM THE LOCATION 1508

MEASURE LIGHT REFLECTED FROM THE LOCATION 1510

MEASURE TEMPERATURE AT THE LOCATION OVER TIME BY MEASURING CHANGES IN REFLECTIVE PROPERTIES AT THE LOCATION 1512

GENERATE A THERMAL PROFILE OF THE OBJECT INDICATIVE OF TEMPERATURE OF THE LOCATION OVER TIME AS THE LOCATION IS HEATED BY THE EXCITATION LASER BEAM AND AS THE LOCATION COOLS AFTER BEING HEATED BY THE EXCITATION LASER BEAM 1514

CHARACTERIZE THE LOCATION OF THE OBJECT BASED ON THE THERMAL PROFILE 1516

TAKE ANOTHER MEASUREMENT OF THE OBJECT AT THE LOCATION, COMPRISING SEPARATING REFLECTED PROBE LASER LIGHT FROM REFLECTED ILLUMINATION LIGHT AND TAKING THE OTHER MEASUREMENT BASED ON THE REFLECTED ILLUMINATION LIGHT 1518

FIG. 13

METHODS OF MEASURING THERMAL PROPERTIES, AND RELATED APPARATUSES

CROSS-REFERENCE TO RELATED APPLICATION

This application claims the benefit under 35 U.S.C. § 119(e) of U.S. Provisional Patent Application Ser. No. 63/379,943, filed Oct. 18, 2022, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-1D14517 awarded by the United States Department of Energy. The government has certain rights in the invention.

TECHNICAL FIELD

Embodiments of the disclosure relate to measuring thermal properties, and to related apparatuses and methods.

BACKGROUND

Thermoreflectance methods include techniques for analyzing the thermal diffusivity and thermal conductivity of objects using reflected light.

BRIEF SUMMARY

Embodiments disclosed herein include a method including heating a location of an object with an excitation laser beam, the excitation laser beam being a continuous-wave laser beam modulated by a square-wave modulation waveform. The method may also include measuring temperature at the location over time by measuring changes in one or more reflective properties at the location.

Additional embodiments are directed to a system. The system may include a first beam splitter in a first optical path toward an object. The first beam splitter may be configured to reflect a portion of an excitation laser beam and a portion of a probe laser beam along the first optical path toward the object. The first beam splitter may be in a second optical path between the object and a detector. The first beam splitter may be configured to transmit at least a portion of a reflected excitation laser beam, reflected from the object, and at least a portion of a reflected probe laser beam, reflected from the object, along the second path. The system may further include an optical filter in the second optical path. The optical filter may be configured to transmit the reflected probe laser beam along the second optical path toward the detector and to not transmit the reflected excitation laser beam along the second path.

Additional embodiments are directed to a method that may include heating a location of an object with an excitation laser beam modulated with a periodic waveform at a single frequency, and measuring changes in reflective properties at the location of the object. The method may further include determining thermal properties at the location based on a known or assumed heat capacity of a material of the object.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIG. 3A, FIG. 3B, and FIG. 3C illustrate a sensitivity analysis on $f-SiO_2$, $CaF_2$, and Ni, respectively, at a modulation frequency of 10 kHz and 1.5 μm spot size.

FIG. 4A, FIG. 4B, and FIG. 4C illustrate maximum magnitude of sensitivity function S for thermal conductivity, diffusivity, spot size, and interfacial resistance vs gold film thickness for $f-SiO_2$, $CaF_2$, and Ni, respectively.

FIG. 12 is a flowchart of an example method, in accordance with various embodiments of the disclosure.

FIG. 13 is a flowchart of another example method, in accordance with various embodiments of the disclosure.

DETAILED DESCRIPTION

Figure 1:
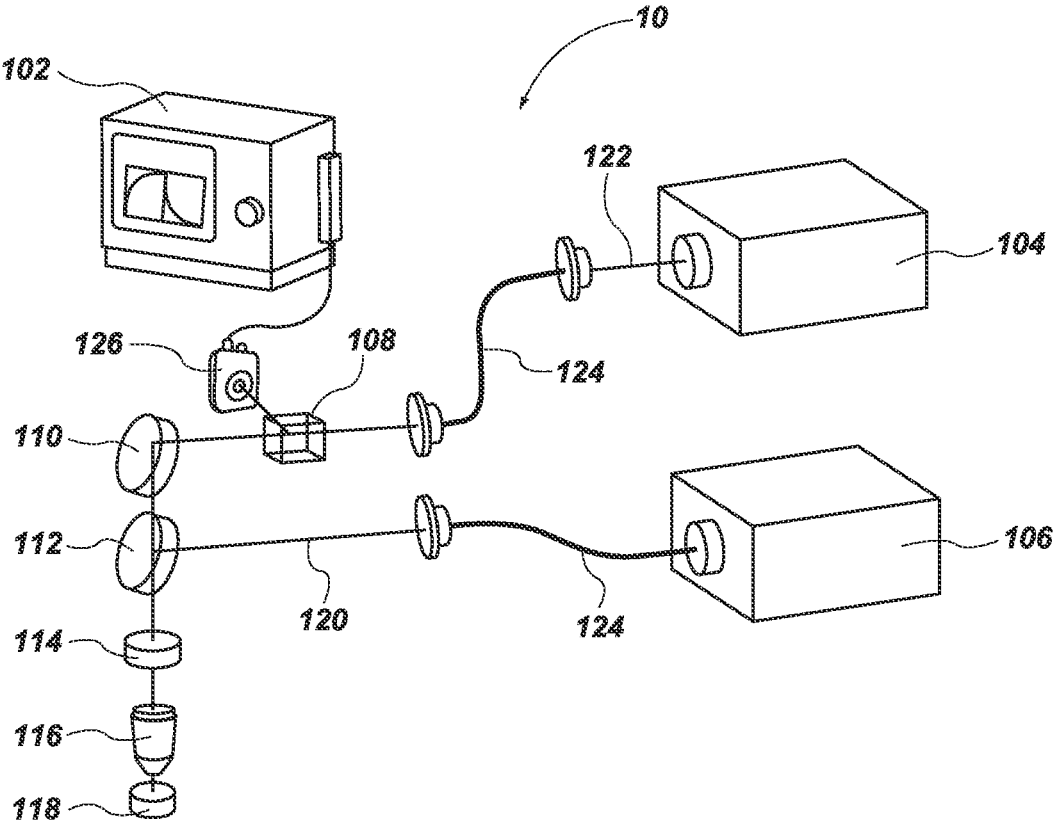
FIG. 1 illustrates an example of an experimental setup for square pulse thermoreflectance (SPTR) measurement.

In the following detailed description, reference is made to the accompanying drawings, which form a part hereof, and in which are shown, by way of illustration, embodiments of the disclosure that may be practiced. These embodiments are described in sufficient detail to enable those of ordinary skill in the art to practice the invention, and it is to be understood that other embodiments may be utilized, and that structural, logical, and electrical changes may be made within the scope of the disclosure.

In this description, specific implementations are shown and described only as examples and should not be construed as the only way to implement the disclosure unless specified otherwise herein. It will be readily apparent to one of ordinary skill in the art that the various embodiments of the disclosure may be practiced by numerous other partitioning solutions. For the most part, details concerning timing considerations and the like have been omitted where such details are not necessary to obtain a complete understanding of the disclosure and are within the abilities of persons of ordinary skill in the relevant art.

Referring in general to the following description and accompanying drawings, various embodiments of the disclosure are illustrated to show their structure and method of operation. Common elements of the illustrated embodiments may be designated with similar reference numerals. It should be understood that the some of the figures presented are not meant to be illustrative of actual views of any particular portion of the actual structure or method, but are merely idealized representations employed to more clearly and fully depict the present invention defined by the claims below.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the embodiments of the disclosure may be implemented on any number of data signals including a single data signal.

It should be further appreciated and understood that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the disclosure described herein.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the general-purpose processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

When executed as firmware or software, the instructions for performing the processes described herein may be stored on a computer-readable medium. A computer-readable medium includes, but is not limited to, non-transitory storage media, such as magnetic and optical storage devices such as disk drives, magnetic tape, CDs (compact disks), DVDs (digital versatile discs or digital video discs), and semiconductor devices such as RAM, DRAM, ROM, EPROM, and Flash memory.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Some embodiments disclosed herein include methods, devices, and/or systems for analyzing an object (e.g., a sample of interest) e.g., through thermoreflectance and another technique (e.g., imaging) at substantially the same time or in parallel. Further, in these or other embodiments, the methods, systems, and/or devices may allow for simultaneously analyzing the same location of the object through thermoreflectance and the other technique. For example, some embodiments disclosed herein include a method including heating a location of the object with an excitation laser beam, the excitation laser beam being a continuous-wave laser beam modulated by a square-wave modulation waveform. The method may also include measuring temperature at the location over time by measuring changes in reflective properties at the location. The method may also include analyzing the location through another technique.

Modern materials design and development efforts across application spaces (e.g., defense, energy, and electronics) are increasingly relying on methods of high-throughput characterization. Large sets of data correlating material microstructures to resulting properties both serve to make material optimization decisions (e.g., processing, alloying, etc.) more quickly and to feed modern, data-intensive design and optimization tools focused on machine learning and artificial intelligence. Some embodiments described herein offer new and distinct sets of material structure-property correlations by capturing thermal properties in a high-throughput manner in multi-analytical materials analysis tools. Capturing such properties in a spatially localized manner in concert with direct evaluation of microstructures is not currently possible using conventional instruments. Some embodiments may be used as an add-on for currently operating materials analysis tools.

For each case, the unmet need is a desire to conduct spatially-correlated multi-analytical measurements of both the structure and properties of materials across classes (e.g., structural, energy, functional, nuclear, etc.). Some embodiments, e.g., with a compact footprint, a solid-state design, and an ultra-high vacuum compatibility, allow for operating analytical tools (e.g., electron microscopes, etc.) to be retrofitted with new diagnostic capability for measuring thermal properties and new multi-analytical tools to be designed e.g., taking into account embodiments disclosed herein. In addition, some embodiments offer an easy platform for laser beam delivery in these environments where future applications such as Raman spectroscopy may be deployed simultaneously.

Customer need exists across application spaces for materials development on many fronts. To date, no effort has been made to engineer a compact, deployable laser-based instrument based on the thermoreflectance principle for the measurement of thermal properties in a high-throughput, correlative manner with local material microstructures. Multianalytical tools such as scanning electron microscopes into which the instrument described here may be deployed are ubiquitous tools in many sectors including aerospace development, defense contractors, semiconductor device manufacturers, academic institutions, and government research laboratories. Materials design and qualification across sectors has experienced a push for expedited testing and combinatorial design. With such drivers, the need for high-throughput tools capable of capturing both the structures and properties of spatially heterogeneous materials has increased rapidly. Conventional laboratory-scale instruments based on the physical principles used here have been complex and expensive and not suited to deployment in multi-analytical environments.

Some embodiments of the disclosure include a compact, solid state, ultra-high-vacuum-compatible optical instrument capable of (e.g., configured to) measuring thermal material properties (e.g., thermal conductivity, thermal diffusivity, and/or heat capacity) on the length scale of single micrometers and on a time scale of the order of seconds. Some embodiments may be all solid state (e.g., no moving parts) with laser light delivered to the instrument support structure in a contained fashion using optical fibers. Some embodiments are compatible with the ultra-high-vacuum environments encountered in multi-analytical materials characterization tools such as scanning electron microscopes. Some embodiments are compact and designed for implementation as an after-market addition to existing imaging devices.

Some embodiments include a technique referred to, as an example, as "square pulse thermoreflectance" or SPTR. SPTR relies on the periodic heating of a small (e.g., micrometer-scale) location on a surface of a sample under interrogation with a train of laser pulses in the shape of a square waveform. In the disclosure, a laser used to heat a specific location of a sample may be referred to as a "pump laser," "heating laser," or "excitation laser" Likewise, the terms "pump beam," "pump laser beam," "heating beam," "heating laser beam," "excitation beam," or "excitation laser beam" may be used to describe a beam used to heat a spot of a sample. The local temperature of the heated area is monitored through the use of a secondary probing laser through the thermoreflectance effect. In the disclosure, a laser used to monitor heat may be referred to as a "probe laser" or a "detection laser." Likewise, the terms "probe beam," "probe laser beam," "detection laser," or "detection laser beam" may be used to describe a beam used to monitor heat. By measuring deviation of the resulting temperature profile from the square impulse (e.g., how fast the temperature changes) thermal properties of the material in question may be measured on the micron scale.

Some embodiments maintain spatial correlation within an ultra-high vacuum chamber with a dedicated so-called "parking" location for thermal or other laser measurements. Some embodiments may allow for physical motion between measurement positions which may provide flexibility to operate in tools where multiple beams of electrons and ions are present. Some embodiments may allow for a far greater variability of optical methods to be deployed compared to single-measure-type instruments constructed co-linearly with an electron pole piece.

Some embodiments enable rapid and highly-spatially correlated measurements of multiple material properties. For example, some embodiments may measure material thermal properties used in applications ranging from, for example, nuclear fuel, to turbine thermal barrier coatings, to power electronics. The ability to directly correlate these thermal properties with highly local material microstructure may greatly reduce uncertainty in the understanding of structure-property relationships for materials under development. This may be important in both combinatorial materials design and in understanding the heterogeneous response of materials to environmental conditions.

Some embodiments provide a technique by which multiple measurements made using the SPTR configuration may be used to determine the thermal properties of materials with substantially (e.g., entirely) unknown characteristics. These or other embodiments may be implemented in a new, compact, fiberized experimental geometry e.g., of a device.

Some embodiments include a compact device for making an SPTR-style measurement. Among other things, the size of the device may allow for such a device to be deployed in combination with other techniques (e.g., other measurement techniques) in a multi-analytical environment, unlike conventional bulkier implementations.

Some embodiments may determine the necessary parameters, space, and configuration to use for SPTR measurements to determine entirely unknown thermal properties with high accuracy.

Some embodiments may be "fiber-delivered" rather than "fiber-based." For example, some embodiments may use fiber coupling to cross an air/ultra-high vacuum barrier, and then launch the laser light into a solid state, free space optical device. The term "free space" may refer to simply "light not confined to a fiber." Some embodiments may manipulate the light path significantly in free space including the use of high power objective lenses, beam splitting cubes, dichroic mirrors, and, ultimately, a semiconducting sensor diode.

Additionally or alternatively, some embodiments may use only a single fiber to carry multiple wavelengths of light to the solid-state instrument support structure.

In some embodiments, a pump and probe are specifically spatially overlapped with no surface distance between them. This may allow for the measurement of the time it takes for a single point to reach an equilibrium temperature given an input of heat as opposed to conventional techniques in which a heat pulse travels a certain distance in the in-plane direction before being measured.

Some embodiments may exhibit the capability of simultaneously optically imaging the surface of the sample in question. Such a capability allows for the ability to spatially locate areas of interest on heterogeneous materials.

Some embodiments include a compact, fiberized platform that allow instruments based on this methodology to be deployed in complex, multi-analytical environments for the type of high-throughput correlative analyses that are key to materials design and discovery.

Laser-based pump-probe thermoreflectance techniques have been demonstrated as powerful tools for the evaluation of thermal properties for a range of materials. Thermoreflectance techniques may be based at least in part on the optical heating of a material by the absorption of a pump or heating laser and the detection of surface temperature using the reflection of a probe or detection laser through the thermoreflectance principle. The excitation and detection are conducted on the same side of materials, and there are few restrictions on sample size or shape. Both the amplitude and phase of the reflected probe laser light are modulated by the surface temperature through the thermoreflectance mechanism and, therefore, may be compared with theoretical thermal diffusion models to extract thermal properties including thermal conductivity, thermal diffusivity, and interfacial thermal resistance.

Some embodiments include combining thermoreflectance techniques with other characterization methods to provide for the high-throughput screening of new materials. The configuration of collinear source and receiver and small laser spot sizes allows for high-resolution spatial mapping of thermal properties without accessing the back side of samples. Such rapid screening may highlight areas of interest with desirable thermophysical properties for subsequent chemical and microstructural analysis. Moreover, some embodiments may enable direct correlation between measurement of thermal properties and local microstructure. Some embodiments described herein may be useful to accelerate new material discovery by providing straightforward connections between material microstructure, chemical, and thermophysical properties through short, nondestructive analysis.

According to some embodiments, the SPTR technique may effectively utilized to measure material thermal properties.

Some embodiments include or employ an experimental setup. FIG. 1 illustrates an example of the experimental setup 10 including an oscilloscope 102, a probe laser 104, a pump laser 106, a polarizing beam splitter (PBS) 108, dichroic minors DM1 110 and DM2 112, a quarter waveplate (QWP) 114, a microscope objective 116, and a sample 118. The experimental setup 10 may include a pump beam 120 from the pump laser 106 and a probe beam 122 from the probe laser 104 derived from optical fibers coupled to a continuous wave (CW) diode laser and a CW semiconductor laser with wavelengths at 660 nm and 532 nm, respectively. These wavelengths are given as examples and are not limiting. For example, the laser wavelengths may be chosen to ensure strong absorption at the pump wavelength and strong thermoreflectance at the probe wavelength. A thin film of metal (e.g., Au, Al) may be deposited on a surface of the sample 118 as a transducer to ensure a large thermoreflectance coefficient and high optical absorption. Gold may be chosen for its large thermoreflectance coefficient at 532 nm, which is compatible with the laser wavelengths listed above.

Both laser beams (i.e., the probe laser beam 122 and the pump laser beam 120) are coupled to optical fibers 124 and subsequently launched, directed to, and focused on the surface of the sample 118 by the dichroic minors (DM1 110 and DM2 112) and the microscope objective 116 (which may comprise various long working distance microscope objectives (e.g., magnifications 50× and 20×)). The power of laser beams 122, 124 reaching the surface of the sample 118 is relatively small and may be adjusted to avoid a large DC temperature rise (1-10 K). The sample 118 may be placed on a high precision vertical stage. The reflected, polarization-controlled probe beam 122 from the surface of the sample 118 is directed to a photodiode 126 through the polarizing beam splitter PBS 108 and the resulting signal is analyzed by the oscilloscope 102, which may be a high speed digital oscilloscope.

Further describing by way of example, the pump beam 120 may be digitally modulated by a 50% duty cycle square wave generated by a function generator. The oscilloscope 102 operates in the trigger mode referenced to the pump modulation signal. Therefore, the measurement time for one point is determined by both the modulation frequency and the number of cycles averaged. As an example, the measured signal may be averaged over thousands of cycles by the oscilloscope 102 to improve the recorded signal to noise ratio and to keep the time of measurement for one point to less than one minute.

After the surface temperature signal is recorded by the oscilloscope 102, the signal is compared to a continuum heat transfer model to generate best-fit thermal properties using least squares regression. The continuum heat transfer model describes the surface temperature of a multilayer structure under a square-wave thermal excitation. First, the square wave x(t) is expressed as the sum of an infinite number of odd harmonic waves:

$$x(t) = \sum_{n=-\infty}^{\infty} \frac{\exp(i\omega t(2n-1))}{2n-1}, \tag{1}$$

where t is time and $\omega$ is the fundamental harmonic frequency.

For each harmonic excitation, the surface temperature response of a two-layer system in the frequency domain is given by:

$$H(\omega) = \frac{Q}{2\pi} \int_0^{\infty} dp\, W(\omega, p) \exp\left(\frac{-p^2(r_0^2 + r_1^2)}{8}\right) p, \tag{2}$$

wherein:

$$W(\omega, p) = \frac{\frac{\gamma_s}{\gamma_f} m + \gamma_s R_{th} + 1}{\gamma_s + \gamma_f \gamma_s R_{th} m + \gamma_f m}, \tag{3}$$

The definition of the parameters in the above equations are listed in Table 1. The subscript represents either substrate (s) or transducer (f).

TABLE 1

Definition of parameters in the model.

| parameter | Definition |
|---|---|
| $r_0$ and $r_1$ | $1/e^2$ radius of pump and probe beams |
| p | spatial Fourier transform coordinate |
| Q | absorbed laser power |
| k | thermal conductivity |
| C | volumetric heat capacity |
| D | thermal diffusivity $\left(D = \dfrac{k}{C}\right)$ |
| q | thermal wave vector $q = \sqrt{p^2 + \dfrac{i\omega}{D}}$ |
| $\gamma$ | $\gamma = qk$ |
| $d_f$ | film thickness |
| $R_{th}$ | interfacial thermal resistance between the substrate and transducer film |
| m | $m = \tanh(q_f d_f)$ |

The resulting temperature response in the time domain under a square wave excitation is obtained by taking the inverse Fourier transform of H(w) and summing the harmonics:

$$T(t) = \sum_{n=-N}^{N} H(\omega(2n-1)) \frac{\exp(i\omega t(2n-1))}{2n-1} \mathrm{sinc}\left(\frac{n}{2N}\right). \tag{4}$$

It is sufficient to take a finite integration limit, N=100 as one example, as the amplitudes of higher harmonics are negligible. The last term in Eq. (4) is the Lanczos sigma factor to remove the undesired Gibbs phenomenon often observed in signal processing.

When the modulation frequency is close to the bandwidth of the photodetector, high-order harmonics will be filtered out, resulting in the distortion of both the pump and probe signal. To account for this, the model is modified to analyze the data of imperfect high frequency square pulses by introducing corrections to Eq. (4):

$$T'(t) = \sum_{n=-N}^{N} H(\omega(2n-1)) \frac{\exp(i\omega t(2n-1))}{2n-1} \mathrm{sinc}\left(\frac{n}{2N}\right) P\exp(i\phi) \tag{5}$$

where P and $\phi$ are the amplitude and phase of the correction function, respectively. These parameters depend on the specifics of experimental instruments. The derivation of these parameters and the impact are provided below.

To explore the parameter space for measurements, several standard materials may be considered. f-SiO$_2$ has a relatively poor thermal conductivity (1.38 W·m$^{-1}$·K$^{-1}$, 0.83 mm$^2$·s$^{-1}$) and represents the lower boundary in this disclosure; CaF$_2$ has moderate thermal properties (9.71 W·m$^{-1}$·K$^{-1}$, 3.59 mm$^2$·s$^{-1}$); and Ni represents structural materials with high thermal conductivity (90.7 W·m$^{-1}$·K$^{-1}$, 23.0 mm$^2$·s$^{-1}$).

The thermal conductivity of gold films has been found to depend sensitively on the film thickness. The conductivities of gold films may be independently characterized if deposited on a substrate with known properties.

An example SPTR signal is simulated using the model described in Eq. (4) and presented in FIG. 2A. FIG. 2A is a graph illustrating theoretical SPTR response on CaF$_2$ and f-SiO$_2$ coated with a 50 nm gold transducer film for modulation frequency of 10 kHz. For these calculations, the interfacial thermal resistance is set to 1×10$^{-8}$ m$^2$·K·W$^{-1}$, the film conductivity to 140 W·m$^{-1}$·K$^{-1}$, and a spot size of 1.5 μm. The waves are normalized by the maximum amplitude and the length of one cycle. The amplitude of reflectance signal is proportional to the temperature change during the experiment under the condition that this change is small according to the principle of thermoreflectance. As presented in FIG. 2A, after a square pulse excitation, the surface temperature rises sharply and begins to flatten out near the middle of cycle. Depending on the length of period or modulation frequency, the surface temperature may or may not reach a steady state at the middle of the cycle. As soon as the pump laser is turned off after the 50% duty cycle, the temperature drops quickly and then slowly returns to its baseline at the end of the period. Over the square pulse cycle, the same amount of energy can be imparted to or removed from the system, both of which have the same mathematical expressions except for the sign of Q in Eq. (2).

The shape of the response signal is extremely sensitive to a material's thermal properties. For CaF$_2$, the observed temperature change is much faster than that of f-SiO$_2$. This indicates that heat is transported faster in CaF$_2$ compared to f-SiO$_2$. By comparing the signal measured on an unknown sample with the tabulated results of standard materials measured with identical spot sizes and modulation frequencies, SPTR offers a rapid method to estimate thermal properties of the unknown sample. Moreover, since only normalized signals are used to extract thermal properties, laser power and absolute temperature change are not key parameters in the analysis, further simplifying the experimental protocol when implementing SPTR measurements.

The simple experimental setup of SPTR may include relatively involved thermal modelling (see Eqs. (1-4)). As these equations indicate, the temperature response is determined by many parameters (e.g., thermal properties of transducer film and substrate, modulation frequency, and laser spot). These properties impact the result in a convoluted manner; thus, it may be important to investigate each parameter separately to determine experimental settings such that the thermal properties of the substrate may be evaluated accurately.

Some qualitative conclusions may be drawn from Eq. (3). For materials with low or moderate thermal properties, numerical calculation indicates that Eq. (3) can be simplified to the following form:

$$W_L(\omega, p) \approx \frac{1}{\gamma_s} \times \frac{1}{1 + m\left(\gamma_f R_{th} + \frac{\gamma_f}{\gamma_s}\right)}. \tag{6}$$

For a thermally thin transducer film with a thickness much smaller than the thermal diffusion length, $\sqrt{2D_f/\omega}$, the parameter m approaches zero such that terms containing m can be omitted. In this limit, $W_L(\omega, p)$ is thus solely determined by substrate thermal properties.

For materials with high thermal conductivity (close to or above 100 W·m$^{-1}$·K$^{-1}$), the simplifications taken to derive Eq. (6) no longer hold and Eq. (3) can be alternatively transformed to the following form:

$$W_H(\omega, p) \approx \frac{1 + \gamma_s R_{th}}{\gamma_s + \gamma_s \gamma_f R_{th} m}. \tag{7}$$

For thermally thin films, the terms containing m can also be safely ignored to obtain:

$$W_H(\omega, p) \approx R_{th} + \frac{1}{\gamma_s}. \tag{8}$$

From Eq. (8), it is apparent that the film may not impact the resulting time-dependent profile. However, the interfacial resistance should not be ignored and may be considered when extracting material thermal properties. When the modulation frequency increases, thermal diffusion length may decrease and approach the transducer film thickness such that function W($\omega$, p) may be more coupled to both the film and interfacial properties.

Figure 2B:
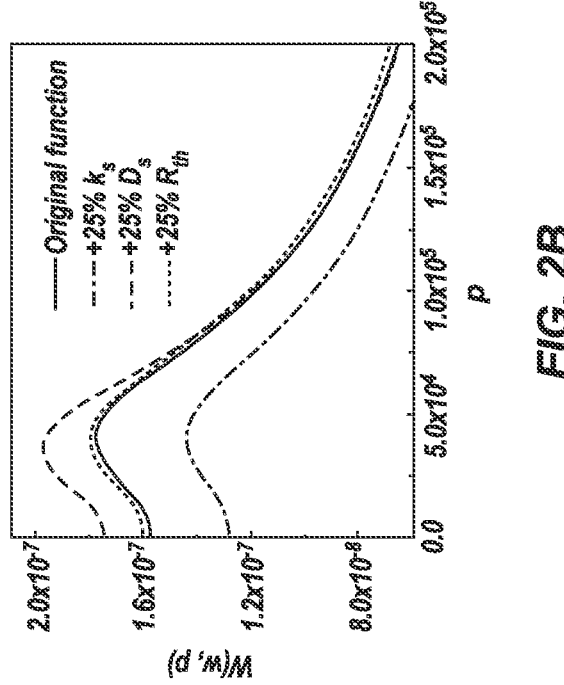
FIG. 2B includes a graph illustrating the function $W(\omega,p)$ simulated on 10-nm gold coated on Ni using a 10 kHz modulation frequency and 1.5 μm spot size.
Figure 2A:
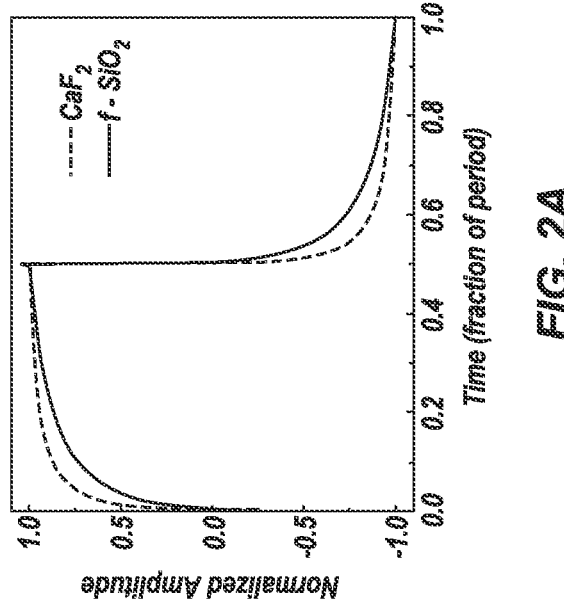
FIG. 2A includes a graph illustrating a theoretical SPTR response on $CaF_2$ and $f-SiO_2$ coated with a 50 nm gold transducer film for modulation frequency of 10 kHz.

To understand the impact of spot size on the SPTR signal, the simulated function W($\omega$, p) is plotted for 10 nm gold coated Ni under 10 kHz modulation frequency in FIG. 2B. FIG. 2B is a graph illustrating the function W($\omega$,p) simulated on 10-nm gold coated on Ni using a 10 kHz modulation frequency and a 1.5 μm spot size. p is the Fourier transform factor of radial coordinate. The dashed lines correspond to 25% changes to $R_{th}$, $k_s$, and $D_s$. In addition, the same function with 25% variations to $R_{th}$, $k_s$, or $D_s$ are also presented FIG. 2B. From FIG. 2B, the impact of $D_s$ is confined to the region where the spatial Fourier parameter p is less than $1 \times 10^5$, whereas $R_{th}$ and $k_s$ impact the response W($\omega$, p) over a very broad range of p. According to Eq. (2), the frequency response H($\omega$, p) is obtained by convolving W($\omega$, p) with Fourier transformed Gaussian spot profile. A large laser spot may reduce the weighting of large p in the integration of Eq. (2), diminishing the impact of film and interfacial resistance while improving the sensitivity to $D_s$. As a result, it is possible to take advantage of different spot sizes and determine multiple thermal properties of a given, fixed layered structure.

To explicitly describe the impact of each parameter $\xi$, a sensitivity function is defined as:

$$S_\xi(t) = \frac{\partial T(t)}{\partial \xi} = \frac{T(\Delta\xi + \xi, t) - T(\xi, t)}{\Delta\xi/\xi}. \tag{9}$$

The function $S_\xi(t)$ for standard materials of 30 nm gold coated f-SiO$_2$, 80 nm gold coated CaF$_2$, and 10 nm gold coated Ni are presented in FIGS. 3A, 3B, and 3C, respectively, where includes thermal diffusivity, D, and conductivity, k, for both film and substrate, as well as laser spot radius and interfacial thermal resistance $R_{th}$ between transducer film and substrate. FIGS. 3A-3C illustrate a sensitivity analysis on f-SiO$_2$, CaF$_2$, and Ni at a modulation frequency of 10 kHz and a 1.5 μm spot size. FIG. 3A illustrates f-SiO$_2$ coated with 30 nm gold, FIG. 3B illustrates CaF$_2$ coated with 80 nm gold, and FIG. 3C illustrates Ni coated with 10 nm gold. The film thicknesses may be chosen to ensure large sensitivity to substrate thermal properties based on FIGS. 4A-4C and related discussions in the following analysis. FIGS. 4A-4C illustrate maximum magnitude of sensitivity function $S_\xi$ for thermal conductivity, diffusivity, spot size, and interfacial resistance vs gold film thickness (10 kHz frequency and 50× objective) for f-SiO$_2$, CaF$_2$, and Ni, respectively. The interfacial thermal resistance is set to $1 \times 10^{-8}$ m$^2$·K·W$^{-1}$, typical in the range of previous measurement. The thermal conductivities of transducer films on f-SiO$_2$, CaF$_2$, and Ni are 135 W·m$^{-1}$·K$^{-1}$, and 80 W·m$^{-1}$·K$^{-1}$, respectively, based on representative values from SDTR measurements. Only half a cycle is presented since the second half carries the same information based on FIG. 2A.

As illustrated in FIGS. 3A-3C, most of the changes happen during the fast-rising section of the square wave period (e.g., before one tenth of a period). In addition, the spot size has a very large impact on the overall result and should be measured accurately. In fact, for most experimental configurations, spot size may have a dominant impact on the temperature response and may be an important experimental parameter as well as a source of error. The rise time r of the temperature response can be roughly approximated by $$\tau = \frac{C_f r^2}{3k_s}.$$

Only the spot radius has a parabolic relationship to r whereas the rest of material properties have first-order ones.

For f-SiO$_2$ and CaF$_2$, the transducer films are thermally thin such that they only have a limited impact on the measured response. In addition to spot size, substrate thermal diffusivity may have an impact. The sensitivity to the substrate thermal conductivity is low but non-negligible, as the convolved spot size is comparable with thermal diffusion length, resulting in some degree of radial thermal transport. Thus, it may be difficult to distinguish thermal conductivity and diffusivity from a single SPTR measurement. On the other hand, the impact of interface is also limited given that substrates with poor conductivity with respect to the film impede heat flow across the interface. For Ni, the impact of the thermal interface increases significantly in accordance with Eq. (8). Heuristically, the difference of thermal conductivity between film and substrate is small so that more heat flows across the interface, which makes the interface more "visible." In addition, the sensitivities of interfacial thermal resistance and substrate conductivity have comparable amplitudes and their curves overlap over much of the signal period. This may present challenges when seeking to separate their impacts.

In the measurements illustrated by FIGS. 3A-3C, the gold film acts as a transducer to optically absorb the pump beam and reflect the probe beam through the thermoreflectance principle. For conventional thermoreflectance techniques, depending on the theory of measurement, the transducer thickness ranges from tens of nanometers to over 200 nm. To investigate the impact of transducer film thickness on the sensitivities of thermal properties, the maximum magnitude of sensitivity function $S_\xi$ for the above three samples in the thickness range of 10-200 nm was calculated and is presented in FIGS. 4A-4C. The thermal conductivity of gold film is based on the interpolation of results independently measured on gold films with various thicknesses. The modulation frequency is set to 10 kHz and the spot size is 1.5 μm. The maximum magnitude of sensitivity $S_\xi$ is defined as the value with the largest absolute magnitude of a sensitivity function in a period. For example, the maximum magnitude of sensitivity $S_{D_s}$ in FIG. 3A is −0.16. Other controlled parameters, such as the thickness and thermal conductivity of transducer film, can be determined separately and are not discussed here. In the subsequent discussion, unless explicitly stated, the absolute values of sensitivity function are used. However, the sign of $S_\xi$ is also important as it indicates the correlation between different properties.

For f-SiO$_2$ and CaF$_2$, the impact of film thickness is greatest on $S_{D_s}$ according to the data illustrated by FIGS. 4A and 4B. The sensitivity of thermal diffusivity decreases significantly for a thicker gold film. The sensitivity of interfacial thermal resistance is minimally impacted for f-SiO$_2$ and slightly decreases for CaF$_2$. For f-SiO$_2$, the sensitivity $S_{k_s}$ increases until 50 nm and then starts to decrease. In contrast, the sensitivity $S_{k_s}$ of CaF$_2$ decreases at first and then slowly increases with the film thickness. The $S_{k_s}$ of f-SiO$_2$ and CaF$_2$ have opposite signs. To measure the thermal properties of f-SiO$_2$, film thickness around 30 nm corresponding to large sensitivities of $k_s$ and $D_s$ is appropriate. As for CaF$_2$, in addition to the sensitivities of thermal properties, the impact of interface should be minimized. Therefore, a film thickness around 90 nm is appropriate for measurement.

From the results in FIG. 4C, the impact of film thickness on Ni is generally limited, except for $S_{R_{th}}$ which decreases considerably with film thickness. The sensitivity $S_{k_s}$ increases slightly and sensitivity $S_{D_s}$ decreases slightly with an increasing film thickness. For these reasons, on highly conductive materials, film thicknesses smaller than 100 nm are appropriate to ensure a large sensitivity to substrate thermal properties.

Figures 5A, 5B, 5C, 5D, 6A, 6B:
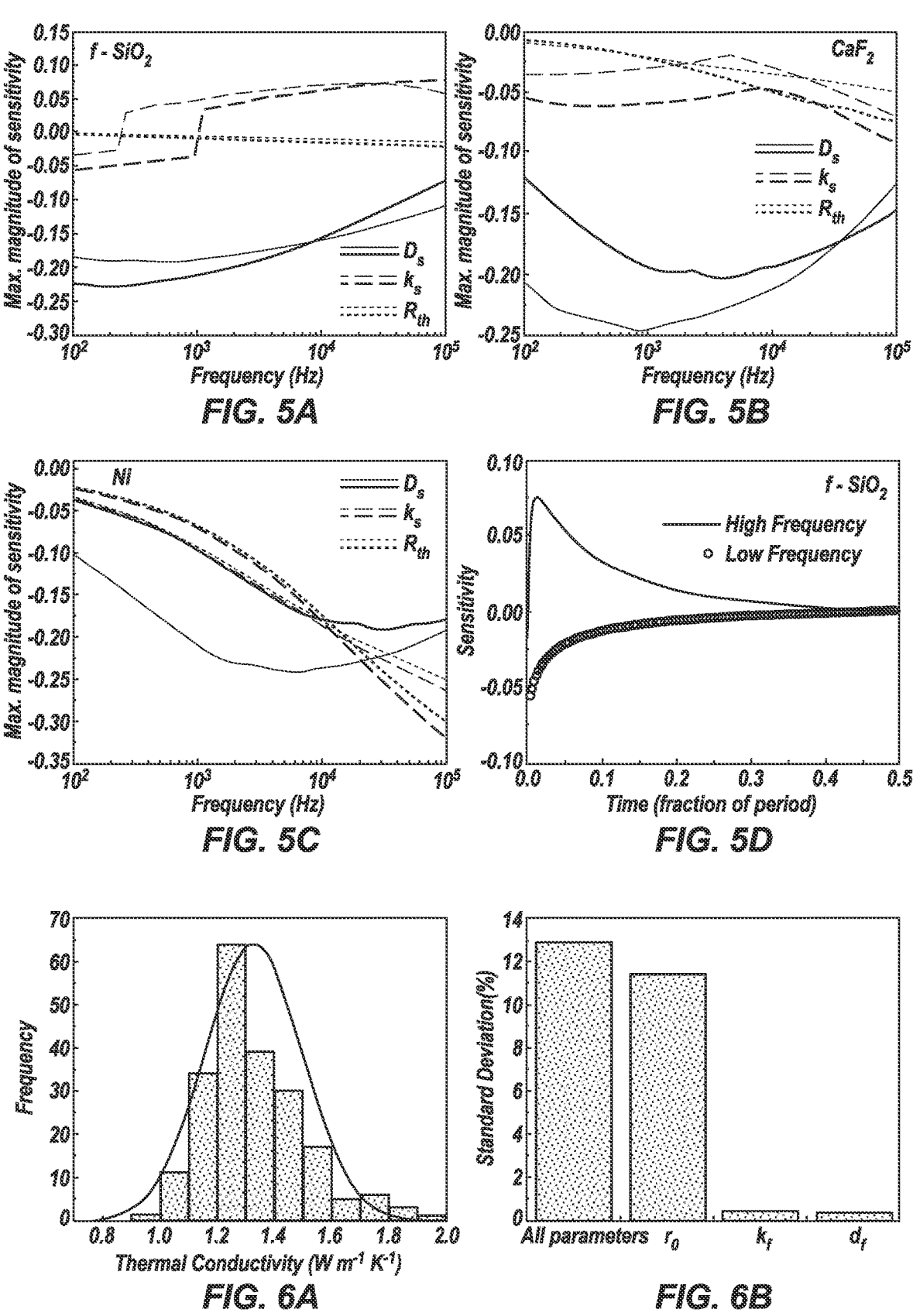
FIG. 5A, FIG. 5B, and FIG. 5C illustrate a maximum magnitude of sensitivity function S for thermal conductivity, diffusivity, and interfacial thermal resistance vs modulation frequency for $f-SiO_2$, $CaF_2$, and Ni, respectively.
FIG. 5D illustrates sensitivity vs time for $f-SiO_2$ at high and low frequencies.
FIG. 6A includes histograms illustrating fitted $f-SiO_2$ thermal properties from Monte Carlo simulations and fitted normal distribution.
FIG. 6B illustrates standard deviation of fitted normal distribution with all controlled parameters considered as well as standard deviations when the uncertainty of only one controlled parameter is considered.

To further investigate the impact of spot size and modulation frequency on the sensitivities of thermal properties, the maximum magnitude of sensitivity function $S_\xi$ for the aforementioned three samples in the frequency range of $10^2$-$10^5$ Hz and under multiple spot sizes may be calculated. The results are presented in FIGS. 5A-5D. FIGS. 5A-5C illustrate a maximum magnitude of sensitivity function $S_\xi$ for thermal conductivity, diffusivity, and interfacial thermal resistance vs modulation frequency (spot size 1.5 μm (solid line) and 3.9 μm (dashed line)) for 30 nm gold coated f-SiO$_2$, 80 nm gold coated CaF$_2$, and 10 nm gold coated Ni, respectively. FIG. 5D illustrates shapes of sensitivity function $S_{k_s}$ for f-SiO$_2$ at low (100 Hz) and high (100 kHz) frequency. The small so-called "kinks" in some curves are numerical artifacts; the true peak position of $S_\xi$ may not be captured by the simulation due to its sharpness. The lower frequency limit is set here by the detector noise level while the higher boundary is limited by the detector bandwidth.

As illustrated in FIGS. 5A-5D, for larger spot sizes, the sensitivity to substrate thermal diffusivity is improved whilst the sensitivities to all other parameters are suppressed, in agreement with the conclusions drawn from FIG. 2B. For materials with poor thermal conductivity, such as f-SiO$_2$, the impact of the interface is limited over a broad range of frequencies and may be ignored in the data analysis. The impact for thermal diffusivity is the strongest near 1 kHz for the 1.5 μm spot size or 300 Hz for 3.9 μm spot size. These frequencies also correspond to the smallest sensitivity to thermal conductivity. Far away from these frequencies the sensitivity of conductivity is improved whereas that of thermal diffusivity drops, thus bringing their sensitivities to comparable level. The abrupt crossover of the maximum magnitude for $S_{k_s}$ from negative to positive value around 1 kHz in FIG. 5A is due to the change of $S_{k_s}$ shape illustrated in FIG. 5D. At low frequencies, the values of $S_{k_s}$ s are negative (symbols in FIG. 5D); in contrast, the shape of $S_{k_s}$ is flipped around the x axis at a high frequency and the maximum magnitude becomes positive (solid line in FIG. 5D).

For moderately conductive materials such as CaF$_2$, interfacial thermal resistance only affects the SPTR temperature profile on the higher end of the considered frequency range. Therefore, to reduce its influence when measuring material thermal properties, it is sufficient to avoid high frequencies. The frequencies corresponding to the largest and smallest sensitivities to thermal diffusivity and conductivity increase compared to those of f-SiO$_2$. Finally, for very conductive materials such as Ni, the sensitivity of interface has a comparable amplitude to those of thermal properties over a broad range of frequency and should be accounted for when extracting material thermal properties.

The above sensitivity analysis suggests that the measurement accuracy depends on the ability to properly account for the interfacial thermal resistance. One single SPTR measurement may not be sufficient to determine all of the three unknown thermal properties that impact the temperature evolution ($D_s$, $k_s$, and $R_{th}$). Some combinations of two thermal properties may be determined by analyzing several measurements in different frequency ranges.

Furthermore, the sensitivity analysis in FIGS. 3A-3C, FIGS. 4A-4C, and FIGS. 5A-5D indicates that the experimental settings may be chosen based on the specific material properties to ensure largest sensitivity to the interested properties and smallest sensitivity to the undesired ones. A large sensitivity corresponds to small errors when extracting thermal properties from experimental data using a multilayer thermal transport model. This especially applies to the experimental settings on poorly or moderately conductive materials to ensure the sensitivity of interfacial thermal resistance is negligible. If the interfacial thermal resistance has a non-negligible sensitivity in a wide range of settings, for example on Ni, it is appropriate to choose settings that have enough sensitivity to the material thermal properties and interfacial thermal resistance so that both quantities can be determined accurately.

Some workable experimental settings based on the material thermal properties are summarized in Table 2. For an unknown material, thermal properties may first be roughly estimated based on the method described with regard to FIG. 2A by comparing the temperature rise time with tabulated results. Afterwards, experimental settings may be shifted based on the recommendations below to make high-confidence measurements of the properties of interest.

If the material heat capacity is already known, the number of unknown thermal parameters is reduced to two, namely $D_s$ and $R_{th}$. The thermal diffusivity of f-SiO$_2$ and CaF$_2$ can be directly obtained from a single measurement of appropriate spot size and frequency that correspond to a large sensitivity to $D_s$ and very small sensitivity to $R_{th}$, such as 1 kHz and 3.9 μm spot size in FIG. 5B. Moreover, the gold film should be thin enough to ensure enough sensitivity to $D_s$ according to the data illustrated by FIGS. 4A and 4B.

On the other hand, if heat capacity is unknown, the distinct sensitivities at different settings can be used and combine two measurements to extract both $D_s$ and $k_s$. Although many combinations of material properties may explain the experimentally obtained temperature response under each experimental setting, the true material properties may be able to generate temperature responses from modelling that may satisfactorily match the experimental results of all combinations of spot sizes and frequencies. The experimental settings may be selected such that the ratios of sensitivities between $D_s$ and $k_s$ are distinct for both cases while maintaining as low a sensitivity to $R_{th}$ as possible. This can be conveniently achieved by adjusting spot size and modulation frequency based on the sensitivity analysis in FIGS. 5A-5D. The thickness of the applied gold transducer film is not convenient to change in experiments compared to spot size or frequency, and therefore should be selected in the range where sensitivities of $D_s$ and $k_s$ have comparable and large amplitudes.

For highly conductive materials, $R_{th}$ should be considered at most frequencies and heat capacity may be known a priori to eliminate one unknown quantity. Two measurements are used to resolve both $D_s$ and $R_{th}$. The experimental settings may be selected so that in one setting, the sensitivity ratio of $D_s$ and $R_{th}$ is distinct from that in the other setting. A large film thickness may be avoided as both the sensitivities of $D_s$ and $R_{th}$ decrease with film thickness, as shown FIG. 4C.

TABLE 2

Workable settings to extract thermal properties.
Two settings are given for some cases that have
distinct sensitivities for interested parameters.

| Material Thermal Conductivity | When Heat Capacity Is Known | When Heat Capacity Is Unknown |
|---|---|---|
| On the order of: (1 W · m$^{-1}$ · K$^{-1}$) | Large spot size and thin transducer; frequency is chosen based on sensitivity analysis (generally below 1 kHz) | Moderate transducer thickness; a) large spot and low frequency, or b) small spot and high frequency |
| On the order of: (10 W · m$^{-1}$ · | Large spot size and thin transducer; frequency is | Moderate transducer thickness; a) large |

TABLE 2-continued

Workable settings to extract thermal properties.
Two settings are given for some cases that have
distinct sensitivities for interested parameters.

| Material Thermal Conductivity | When Heat Capacity Is Known | When Heat Capacity Is Unknown |
|---|---|---|
| K$^{-1}$) | chosen based on sensitivity analysis (generally below 1 kHz) | spot and low frequency or b) small spot and moderate frequency |
| On the order of: (100 W · m$^{-1}$ · K$^{-1}$) | Small to moderate film thickness; a) large spot and low frequency, or b) small spot and high frequency | n/a |

There are multiple factors that may influence the reliability of the SPTR technique. One is the accurate measurement of laser spot size given the extreme sensitivity evidenced by FIGS. 3A-3C where, in almost all cases, the sensitivity to spot size is larger than that of the thermal properties. Therefore, determining the spot size for each experimental configuration and objective lens choice is of importance. Even for a well-characterized experiment, when the sample surface is not placed at precisely the focal plane of the objective, the change in spot size will impact the fitting results. For example, for a 50× high magnification objective with a short depth of focus, defocusing by 5 μm can change the projected spot size by 9.5% and the optimized thermal properties by 16%. Therefore, high precision vertical stages with a minimum step size less than 1 μm are recommended for SPTR experimental arrangements.

To quantitatively estimate the distribution of errors associated with thermal properties, a Monte Carlo method was applied to the optimization of the multilayer transport model expressed in Eq. (4) to several sets of experimental data. Each of the "controlled parameters" in this implementation of SPTR can influence the total measurement error, for example, the thickness and thermal conductivity of gold film and the convolved pump-probe spot size. To propagate these errors through the forward model, uncertainties associated with each control parameter were experimentally measured. For spot size a standard error of 5% is assumed. The errors associated with the thickness and thermal conductivity of film are 2% and 2.4%. Each parameter is assumed to have a normal distribution around its mean value with a standard deviation. The model was fitted with updated controlled parameters to the representative results repeatedly and obtained the distributions of fitted thermal properties. Here f-SiO$_2$ (3.9 μm spot size and 400 Hz) was taken as an example and the fitted thermal conductivity assuming a known heat capacity is presented in FIG. 6A. FIG. 6A includes histograms illustrating fitted f-SiO$_2$ thermal properties from Monte Carlo simulations and fitted normal distribution. FIG. 6B illustrates standard deviation of fitted normal distribution with all controlled parameters considered as well as standard deviations when the uncertainty of only one controlled parameter is considered. The fitted values of thermal diffusivity follow a normal distribution with a standard deviation of 12.9% that is very close to the experimental error determined through statistics of multiple measurements made on a single sample.

Next, the same kind of simulation was repeated when only the finite uncertainty in a single control parameter—spot size, film thickness, or film thermal conductivity—is considered. The resulting errors are summarized in FIG. 6B. The standard deviation produced by the uncertainly of spot size alone is 11.4% and is comparable to the total standard deviation when all controlled parameters are considered. In contrast, the ultimate uncertainty due to film properties produces less than 1% standard deviation in fitted thermal conductivity; their impact is minimal. Based on FIG. 6B, the uncertainly of spot size may be the largest source of error.

Errors can also originate from an imperfect square wave excitation signal. The model expressed in Eqs. (1-4) considers ideal square excitation waves which in practice may not be achieved due to finite electronic bandwidth. At high frequencies comparable to the detector bandwidth, severe distortion and artifacts of the pump signal are possible. Moreover, overshoot, undershoot, and ringing (together referred to as Gibbs phenomenon), as well as signal delays, also emerge at high frequency. However, a large bandwidth often comes at a cost of low gain, which subjects the signal to the system's random noise. Therefore, the selection of modulation frequency not only depends on the sensitivity of the interested thermal property, but instrument parameters as well. The electronic characters of the signal processing system should be properly accounted for before high-quality data may be collected.

Although these phenomena can be partially alleviated by post-processing, such as the Lanczos sigma factor, assuming an ideal square wave can lead to an inaccurate estimation of conductivity at high frequency The imperfect square may result in an underestimation of thermal conductivity by a large margin if not properly accounted for. The components (e.g., cables, detector, lasers, etc.) of the system have different responses to different harmonics of the fundamental frequencies expressed in Eq. (1). These responses can be evaluated together as a systematic transfer function. As a result, the forward model may require a modification to analyze the data of imperfect high frequency square pulses by introducing corrections to Eq. (4). The resultant Eq. (5) includes P and $\phi$ as the amplitude and phase of the systematic transfer function, respectively. To derive these parameters of transfer function, a Fourier transform of the imperfect square wave pump signal collected directly by the photodetector at each modulation frequency is taken and compared with the parameters in Eq. (1). The detailed procedure for applying this correction is described below.

Ideally, a square wave can be expressed by Eq. (1). Each harmonic has an equal phase of zero and a 1/(2n−1) amplitude. In an actual experiment, however, the signal is processed by various electrical circuits which may introduce distortions. These distortions are most often frequency dependent. To conveniently capture these effects, a lumped transfer function may be used to account for the changes to both amplitude and phase.

First, the imperfect square pulse is measured by removing the short-pass filter normally placed in front of the detector to reject any pump light, shutting down the probe laser, and collecting the pump signal reflected by sample surface using the photodetector.

Next, to derive the transfer function, the collected non-ideal square wave is expressed as:

$$x'(t) = \sum_{m=-\infty}^{\infty} P_m \frac{\exp(im\omega t + i\phi_m)}{m} \tag{10}$$

where m are odd integers.

Taking advantage of the relation $\int \sin(mt) \sin(nt)dt = \delta_{nm}$ ($\delta$ is Kronecker delta function), the following relations are obtained:

$$P_{m,1} = \int_0^{1/f} m x'(t)\cos(m\omega t)dt$$

$$P_{m,2} = \int_0^{1/f} m x'(t)\sin(m\omega t)dt \tag{11}$$

from which the factors P$_m$ and $\phi_m$ can be expressed as:

$$P_m = \sqrt{P_{m,1}^2 + P_{m,2}^2} \tag{12}$$

-continued $$\phi_m = \operatorname{atan}\left(\frac{P_{m,2}}{P_{m,1}}\right).$$

Some embodiments, including those including or employing an SPTR technique may be useful to measure thermal properties for a wide range of materials and to explore the parameter space for measurements. The SPTR technique uses the thermoreflectance principle to monitor the amplitude evolution of surface temperature and has many advantages compared to other thermophysical characterization techniques, such as ease of operation, fast data acquisition, and compact instrumentation. An analytical model is developed to simulate the thermal transport. A measurement error of around 12%, mostly originating from the uncertainty of the applied laser spot size, is confirmed through a Monte Carlo analysis. Limitations of the technique, particularly high sensitivity to laser spot size and wave distortion at high frequencies, are discussed. This approach provides an attractive solution for applications where extensive optical alignment is not feasible and offers an opportunity to measure thermal property in a fast and convenient fashion with high accuracy and resolution. The compact and fiberized nature of this and other possible experimental arrangements offers a promising route for the development of multi-analytical tools for expedited materials design and discovery.

Figure 7:
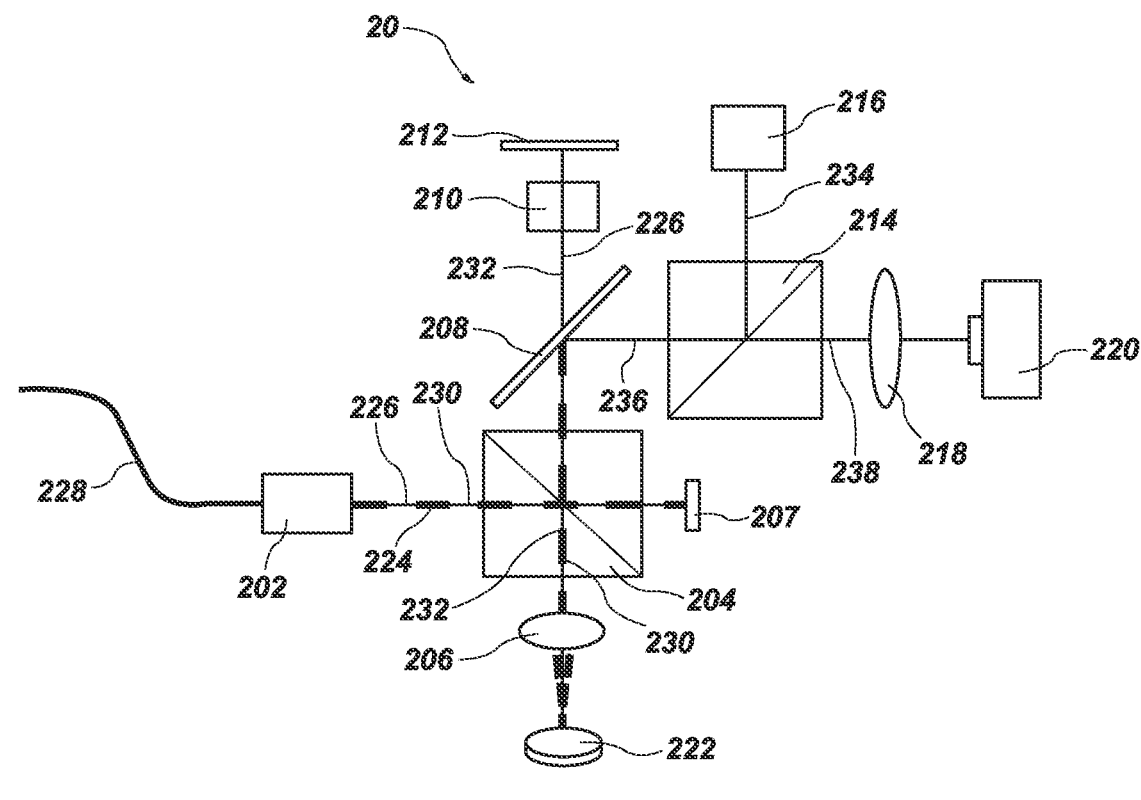
FIG. 7 is a functional block diagram illustrating an example optical arrangement for a laser instrument according to one or more embodiments.

FIG. 7 is a functional block diagram illustrating an example optical arrangement 20 for a laser instrument according to one or more embodiments. The optical arrangement 20 includes a collimator 202, a first beam splitter 204 (e.g., a non-polarizing beam-splitter cube), a microscope objective 206, a beam dump 207, a first optical filter 208 (e.g., a dichroic short pass filter), a second optical filter 210 (e.g., a band pass filter), a detector 212 (e.g., a photodetector), a second beam splitter 214 (e.g., a non-polarizing beam splitter cube), an illumination source 216 (e.g., an illumination source for imaging, e.g., an LED), a lens 218 (e.g., an imaging system lens), and an imaging system 220 (e.g., a camera). The optical arrangement 20 may be configured to allow thermoreflectance measurements to be taken of an object 222 (e.g., a sample of interest). The optical arrangement 20 may further be configured to allow additional measurements or images to be taken of the object 222.

The collimator 202 may be configured to receive an excitation laser beam 224 and a probe laser beam 226 from a fiber-optic cable 228 and to direct the excitation laser beam 224 and the probe laser beam 226 along a first optical path 230 between the collimator 202 and the object 222. The first optical path 230 may be a free-space optical path.

The first beam splitter 204 may be in the first optical path 230 between the collimator 202 and the object 222. The first beam splitter 204 may be configured to reflect a portion of the excitation laser beam 224 and a portion of the probe laser beam 226 along the first optical path 230 toward the object 222. The first beam splitter 204 may be configured to reflect a portion of the total intensity of the excitation laser beam 224 and the probe laser beam 226. As an example, the first beam splitter 204 may transmit 50% of incoming light and to reflect 50% of the incoming light. The portion of light that is transmitted and the portion of light that is reflected may be any suitable ratio e.g., 60% transmitted and 40% reflected, or 40% transmitted and 60% reflected.

The microscope objective 206 may be in the first optical path 230 between the first beam splitter 204 and the object 222. The microscope objective 206 may be configured to focus the excitation laser beam 224 and the probe laser beam 226 onto the object 222.

After the excitation laser beam 224 and the probe laser beam 226 beam are reflected off the object 222, a portion of the reflected excitation laser beam 224 and the probe laser beam 226 may be directed by the microscope objective 206 back toward the first beam splitter 204 along a second optical path 232 between the object 222 and the detector 212. The second optical path 232 may be a free-space optical path.

The first beam splitter 204 may be configured to transmit at least a portion of the reflected excitation laser beam 224, reflected from the object 222, and at least a portion of the reflected probe laser beam 226, reflected from the object 222, along the second optical path 232.

The first optical filter 208 may be in the second optical path 232. The first optical filter 208 may be configured to transmit the reflected probe laser beam 226 along the second optical path 232 toward the detector 212 and to not transmit the reflected excitation laser beam 224 along the second optical path 232. The first optical filter 208 may be configured to transmit or not transmit light according to wavelengths. As an example, the first optical filter 208 may be configured to transmit the probe laser beam 226 and to not transmit (e.g., reject) the excitation laser beam 224 based on wavelengths of the excitation laser beam 224 and the probe laser beam 226. The first optical filter 208 may be selected based on the wavelengths of the excitation laser beam 224 and the probe laser beam 226. Additionally or alternatively, the excitation laser beam 224 and/or the probe laser beam 226 may be selected based on the first optical filter 208. As an example, the probe laser beam 226 may have a wavelength of 532 nanometers (nm), the excitation laser beam 224 may have a wavelength of 660 nm, and the first optical filter 208 may be configured as a low-pass optical filter to transmit light having a wavelength of less than 600 nm. The wavelengths of the probe laser beam 226 and the excitation laser beam 224 are given as examples. Similarly, a wavelength of light filtered by the first optical filter 208 is given as an example. Any suitable wavelengths may be used and/or filtered in the optical arrangement 20 of FIG. 7.

The second optical filter 210 may be in the second optical path 232 between the first optical filter 208 and the detector 212. The second optical filter 210 may be configured to filter the reflected probe laser beam 226. The second optical filter 210 may be configured to transmit or not transmit light according to wavelengths. As an example, the second optical filter 210 may be a pass-band optical filter configured to pass a narrower range of wavelengths including the probe laser beam 226 but excluding other wavelengths. As an example, the probe laser beam may have a wavelength of 532 nm and the second optical filter 210 may be configured to transmit light having wavelengths of between 520 nm and 540 nm. The wavelength of light filtered by the second optical filter 210 is given as an example. Any suitable wavelengths may be filtered in the optical arrangement 20 of FIG. 7.

The detector 212 may be configured to receive the reflected probe laser beam 226. The detector 212 may be configured to translate received light (e.g., of the reflected probe laser beam 226) into signals indicative of the received light. The detector 212 may provide the signal to a computing system that may analyze the received light, e.g., according to thermoreflectance techniques, e.g., as described herein.

The illumination source 216 may be configured to provide an illumination beam 234 along a third optical path 236. The illumination beam 234 may be light in any suitable wavelength corresponding to light to be detected by the imaging system 220. The third optical path 236 may be a free-space optical path.

The second beam splitter 214 may be in the third optical path 236 between the illumination source 216 and the object 222. The second beam splitter 214 may be configured to redirect the illumination beam 234 along the third optical path 236 toward the first optical filter 208.

The first optical filter 208 may be configured to redirect the illumination beam 234 along the third optical path 236 toward the first beam splitter 204.

The first beam splitter 204 may be configured to transmit at least a portion of the illumination beam 234 toward the object 222.

The microscope objective 222 may be in the third optical path 236 between the first beam splitter 204 and the object 222. The microscope objective 206 may be configured to focus the illumination beam 234 onto the object 222.

After the illumination beam 234 is reflected off the object 222, a portion of the illumination beam 234 may be directed by the microscope objective 206 back toward the first beam splitter 204 along a fourth optical path 238 between the object 222 and an imaging system 220. The fourth optical path 238 may be a free-space optical path.

The first beam splitter 204 may be in a fourth optical path 238 between the object 222 and the imaging system 220, the first beam splitter 204 may be configured to transmit at least a portion of a reflected illumination beam 234, reflected from the object 222, along the fourth optical path 238 toward the first optical filter 208.

The first optical filter 208 may be configured to redirect the reflected illumination beam 234 along the fourth optical path 238 toward the second beam splitter 214.

The second beam splitter 214 may be configured to transmit at least a portion of the reflected illumination beam 234 along the fourth optical path 238 toward the imaging system 220.

The lens 218 may be in the fourth optical path 238 between the second beam splitter 214 and the imaging system 220, the lens 218 may be configured to focus the reflected illumination beam 234 for the imaging system 220.

The imaging system 220 may include a charge-coupled device image sensor. In some embodiments, the imaging system 220 may be, or may include, a digital camera or a spectroscope.

Additionally, though not illustrated in FIG. 7, the imaging system 220 may include additional optical components (e.g., lenses) at various positions within the optical system.

The first optical path 230 and the second optical path 232 of the optical arrangement 20 of FIG. 7 between the collimator 202, the object 222, and the detector 212 may provide for thermoreflectance measurements to be taken and/or thermoreflectance analysis to be performed on the object 222. The third optical path 236 and the fourth optical path 238 of the optical arrangement 20 of FIG. 7 between the illumination source 216, the object 222, and the imaging system 220 may provide for other measurements to be taken and/or other analysis to be performed concurrently with the thermoreflectance measurements and analysis. Further, the thermoreflectance measurements may be taken from the same location as the other measurements are taken. As an example, while thermoreflectance measurements are being taken of a location on the object 222, image measurements may be taken of the same location.

Thus, the optical arrangement 20 of FIG. 7 may allow spatially-correlated multi-analytical measurements of both the structure and properties of materials.

Figure 8:
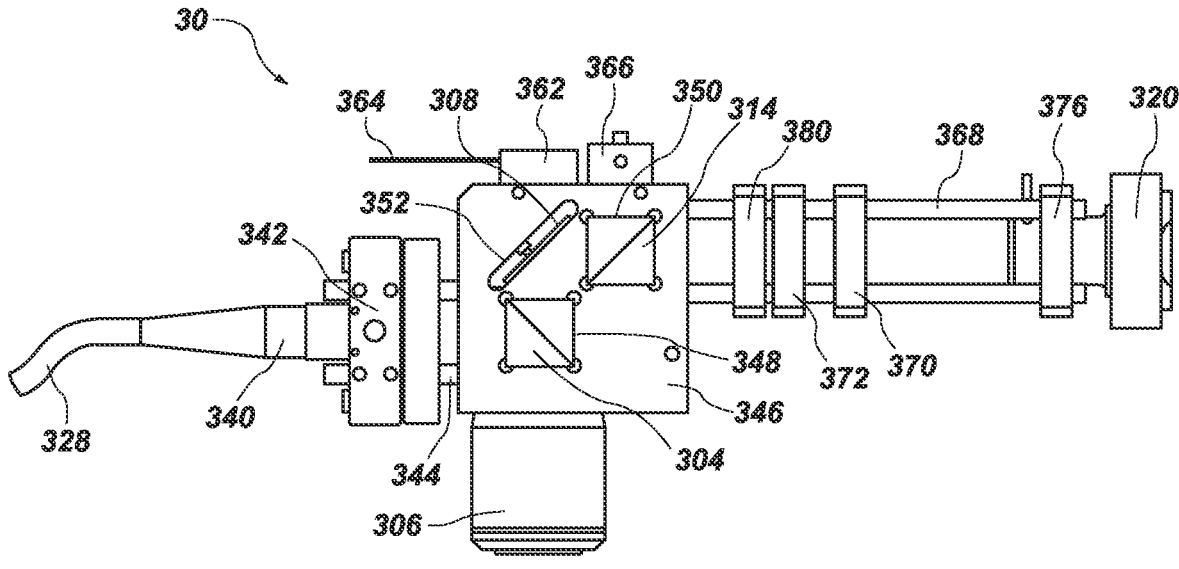
FIG. 8 illustrates embodiments of the optical device described by the schematic in FIG. 7.
Figure 9:
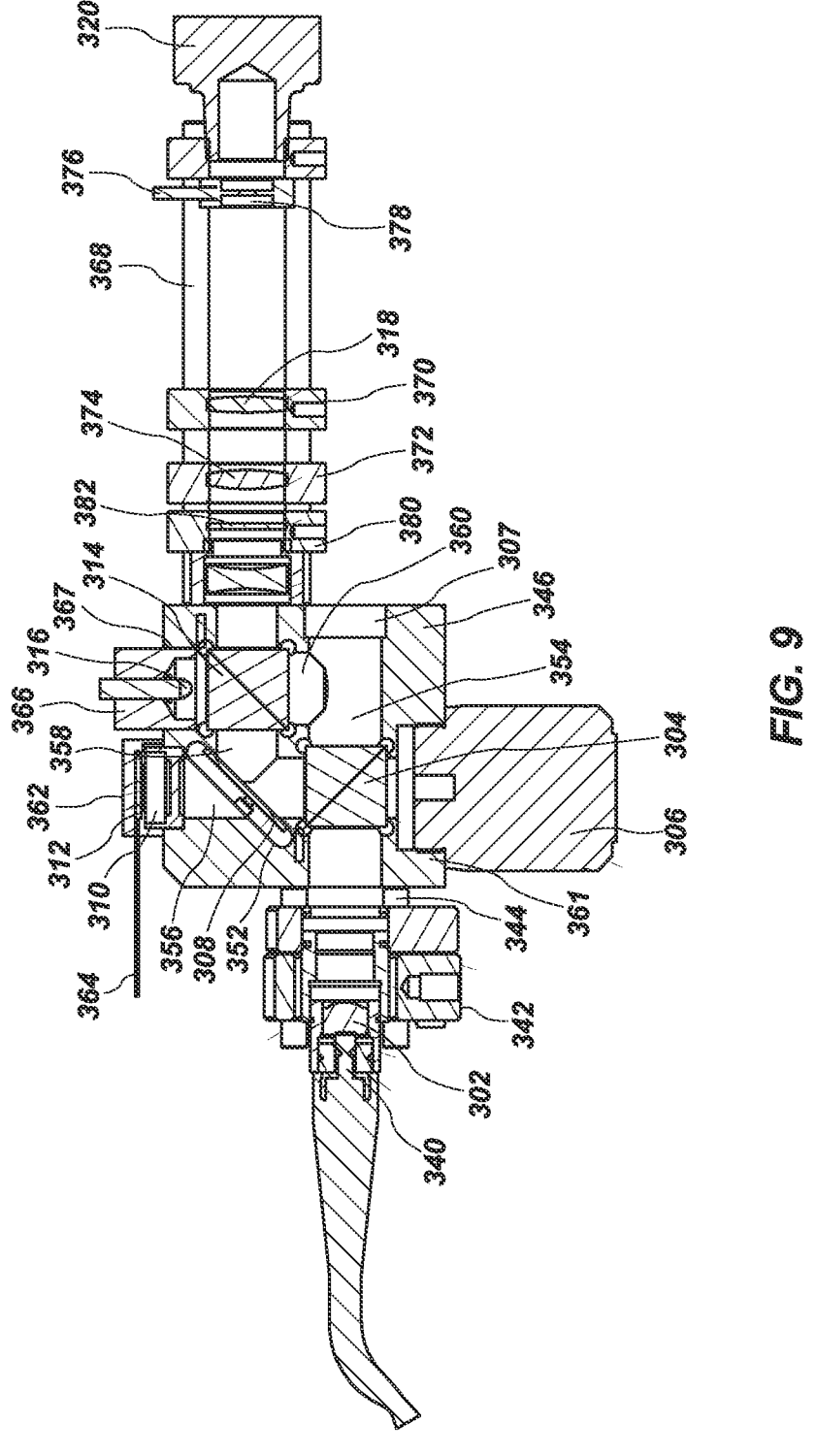
FIG. 9 illustrates the cross section of the embodiment of the optical device shown in FIG. 8, showing the location of various optical elements as described in FIG. 7.

FIG. 8 illustrates some embodiments of an optical device described by the schematic of the optical arrangement 20 in FIG. 7, and FIG. 9 illustrates a cross-section of the optical device shown in FIG. 8, showing the location of various optical elements as described in FIG. 7. To avoid repetition, not all features shown in FIGS. 8 and 9 are described in detail herein. Rather, unless described otherwise below, in FIGS. 8 and 9, a feature designated by a reference numeral that is a 100 increment of the reference numeral of a feature previously described with reference to FIG. 7 will be understood to be substantially similar to the previously described feature. By way of non-limiting example, unless described otherwise below, features designated by the reference numerals 306, 312 in FIGS. 8 and 9 respectively will be understood to be substantially similar to the microscope objective 206 and detector 212 previously described herein with reference to FIG. 7.

FIGS. 8 and 9 illustrate an optical device 30 comprising an optical fiber 328 and collimator 302 to deliver one or more wavelengths of laser light to an instrument support structure 346. The support structure 346 may comprise an aluminum block that is formed and/or machined to house components of the optical device 30. In some embodiments, the support structure 346 and components of the optical device 30 supported by the support structure 346 may be configured for operation within an ultra-high vacuum chamber (not shown). The optical fiber 328 may be configured to comprise a fiber coupling (not shown) to cross an air/ultra-high vacuum barrier to deliver the laser light from outside the ultra-high vacuum chamber to the support structure 346. The optical fiber 328 may connect to the collimator 302 via a connector 340 that connects to a beam steering device 342 that supports the collimator 302. The beam steering device 342 may comprise one or more plates comprising an aperture allowing the laser light from the collimator to pass through to the support structure 346. The beam steering device 342 may further comprise additional optomechanical devices that are configured to steer the laser light from the collimator 302.

The collimator 302 and beam steering device 342 may be mounted to the support structure 346 via first support rods 344. The first support rods 344 may be attached to the support structure 346 in any suitable manner such as via welding, an interference fit, fasteners, etc. In some examples, the beam steering device 342 may be configured to translate along the first support rods 344.

The support structure 346 is configured to support the various elements of the optical device 30 and to provide pathways for the laser light delivered by the optical fiber 328 or light delivered by the illumination source 316, such as for the first, second, third, and fourth optical paths 230, 232, 236, 238 discussed with reference to FIG. 7. For example, the support structure 346 may comprise a first square hole 348 and a second square hole 350 formed in a surface of the support structure 346 accommodating the first beam splitter 304 and the second beam splitter 314, respectively. The support structure 346 may also comprise a slot 352 formed through the support structure 346 accommodating the first optical filter 308. The support structure 346 may also comprise a threaded aperture 361 configured to receive the microscope objective 306.

As shown in FIG. 9, the support structure 346 may comprise a first internal passageway 354, a second internal passageway 356, a third internal passageway 358, and a fourth internal passageway 360. The first internal passageway 354 may align with the collimator 302, the first beam splitter 304 and the beam dump 307, allowing light to pass from the collimator 302 to the first beam splitter 304. The second internal passageway 356 may align with the first beam splitter 304, the microscope objective 306, the first optical filter 308, the second optical filter 310, and the detector 312. The second internal passageway 356 may allow light to be transmitted between the first beam splitter 304, the microscope objective 306, the first and second optical filters 308, 310, and the detector 312. The third internal passageway 358 may be aligned with the first optical filter 308, the second beam splitter 314, and a camera system 320. The third internal passageway 358 may allow light to be transmitted between the first optical filter 308, the second beam splitter 314, and the camera system 320. The fourth internal passageway 360 may be aligned with the illumination source 316 and the second beam splitter 314 and may accommodate light transmission between the illumination source 316 and the beam splitter 314.

The support structure 346 may further comprise a detector housing 362 that is disposed on or built into a surface of the support structure 346 that is aligned with the first internal passageway 354. The detector housing 362 may house the second optical filter 310 and the detector 312. An output from the detector 312 may be transmitted to an external device outside the vacuum chamber for processing via a wire 364 that crosses the air/ultra-high vacuum barrier. By relaying the output from the detector 312 to an external device outside the vacuum chamber, the optical device 30 may be kept more compact.

An illumination housing 366 may be provided to house the illumination source 316. The illumination housing 366 may also be configured as a heat sink to absorb heat energy created by the illumination source 316. In some embodiments, the illumination housing 366 may be comprised of a copper material and may be inserted into the support structure 346 via a threaded opening 367 in the support structure 346.

Second support rods 368 may be attached to the support structure 346 on which the camera system 320 may be mounted. The second support rods 368 may be attached to the support structure 346 in any suitable manner such as via welding, an interference fit, fasteners, etc. The second support rods 368 may further support a first optical housing 370 that supports the lens 318. The first optical housing 370 may be fixed at a predetermined position on the second support rods 368 or may be translatable along the second support rods 368. In some embodiments, a linear actuator may be provided to move the first optical housing 370 to various positions along the second support rods 368.

In some embodiments, additional optical elements may be positioned on the second support rods as desired for obtaining an image using the imaging system 320. For example, a second optical housing 372 may support a second lens 374, a third optical housing 376 may support an iris 378, and a fourth optical housing 380 supporting a third filter 382. The first, second, third, and fourth optical housings 370, 372, 376, 380 may be fixed relative to the second support rods 368 or may be moveable relative to the second support rods 368.

Figure 10:
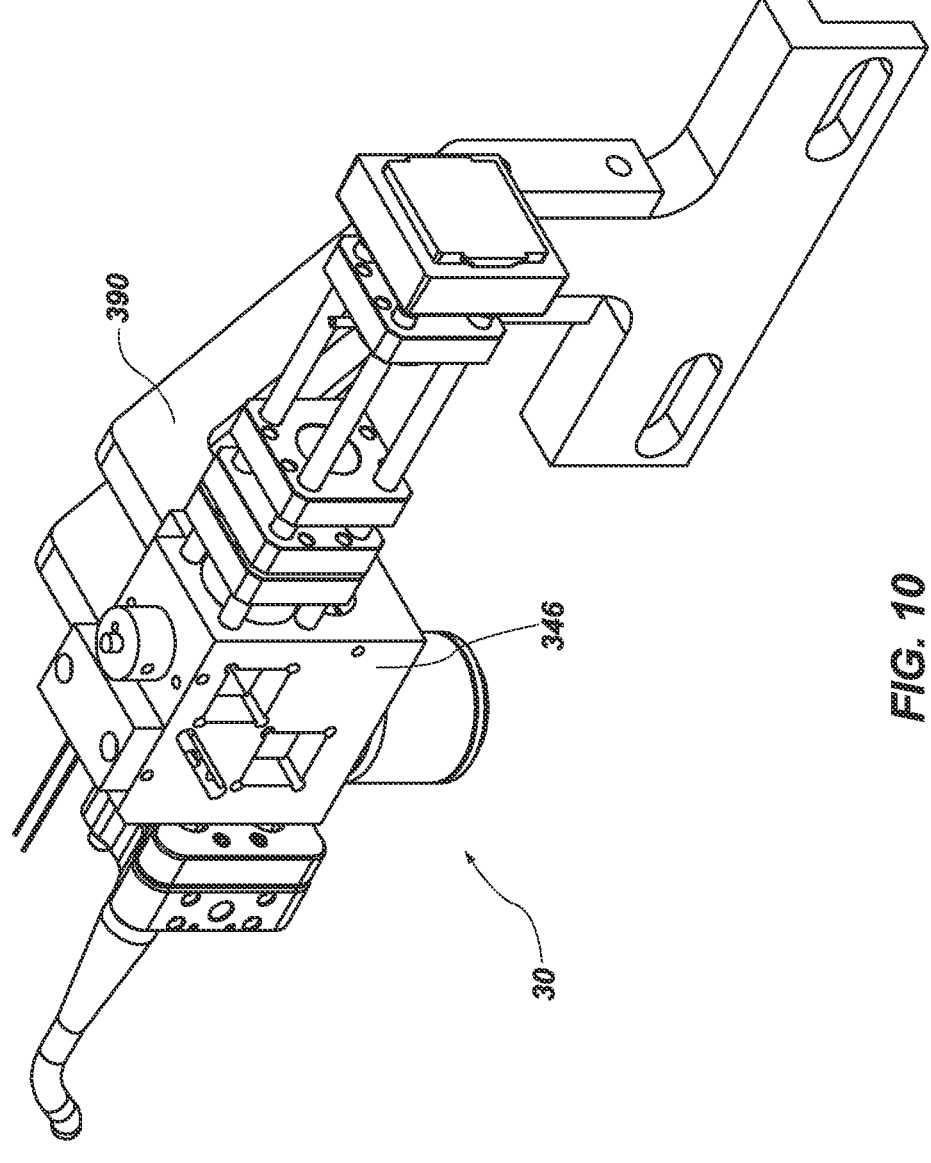
FIG. 10 illustrates an armature configured to retain the instrument support structure illustrated in FIG. 8 within a test bed.

FIG. 10 illustrates an armature configured to retain the instrument support structure illustrated in FIG. 8 within a test bed. As shown in FIG. 10, the optical device 30 may be attachable to an armature 390. In some embodiments, the optical device 30 may be removably attachable to the armature 390, such as via fasteners attaching the support structure 346 to the armature 390. In some embodiments, the armature 390 and the support structure 346 can be formed together as a single piece.

Figure 11:
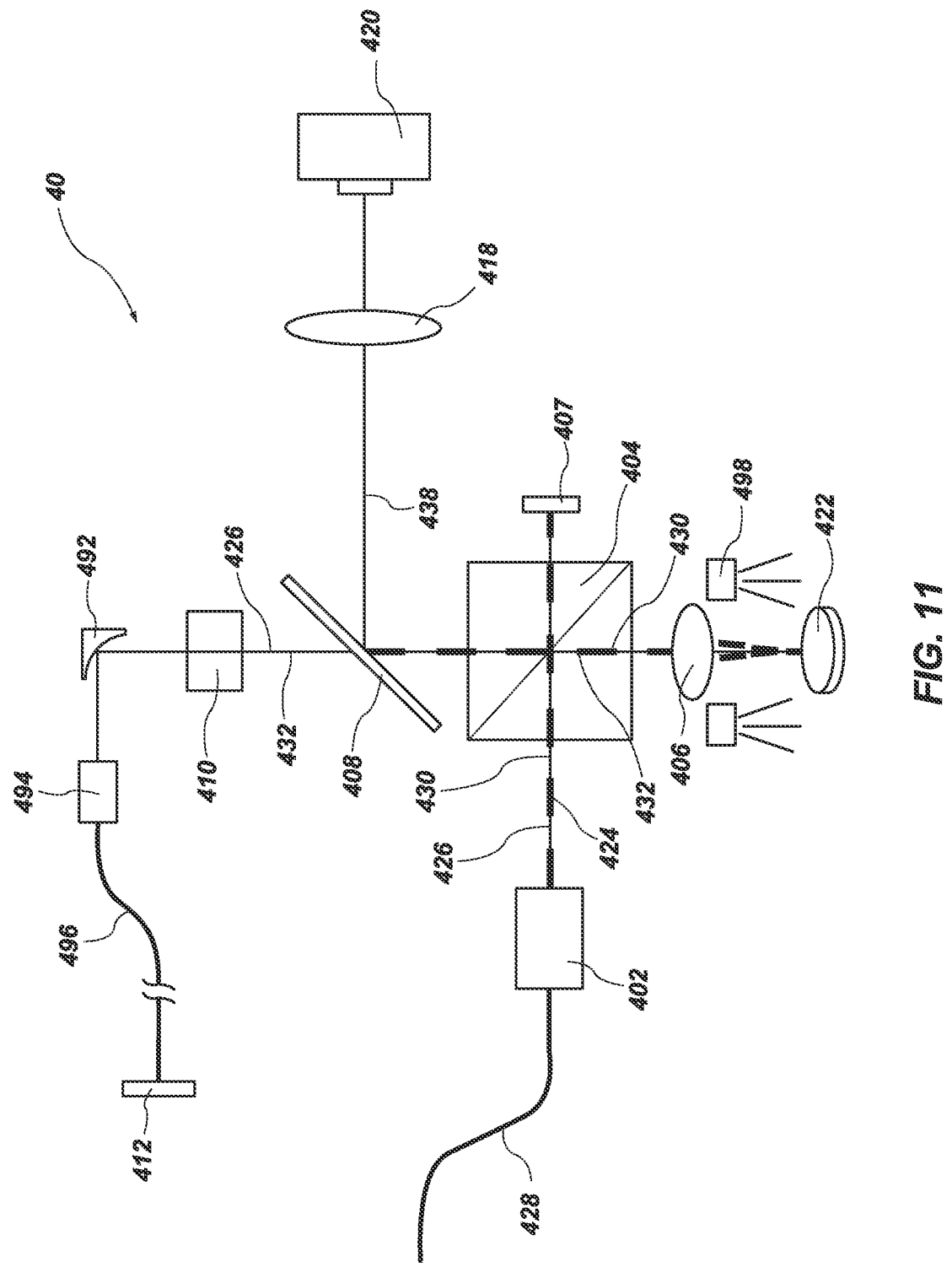
FIG. 11 is a functional block diagram illustrating an example optical arrangement for a laser instrument according to one or more embodiments.

FIG. 11 is a functional block diagram illustrating an example optical arrangement for a laser instrument according to one or more embodiments. To avoid repetition, not all features shown in FIG. 11 are described in detail herein. Rather, unless described otherwise below, in FIG. 11, a feature designated by a reference numeral that is a 200 increment of the reference numeral of a feature previously described with reference to FIG. 7 will be understood to be substantially similar to the previously described feature. By way of non-limiting example, unless described otherwise below, features designated by the reference numerals 406, 412 in FIG. 11 respectively will be understood to be substantially similar to the microscope objective 206 and detector 212 previously described herein with reference to FIG. 7.

In FIG. 11, an optical arrangement 40 is similar to the optical arrangement 20 shown in FIG. 7 in many aspects. In the optical arrangement 40, the detector 412 is positioned to be outside of the ultra-high vacuum chamber to provide additional space savings to the optical arrangement 40 within the ultra-high vacuum chamber. The second optical path 432 in FIG. 11, after passing through the second optical filter 410, is diverted towards a fiber coupler 494 via a focusing minor 492. The focusing mirror 492 directs the probe laser beam 426 to the fiber coupler 494 such that the probe laser beam 426 is focused on the fiber coupler 494 to be directed through an optical fiber return cable 496. The optical fiber return cable 496 is configured to pass through the air/ultra-high vacuum barrier and deliver the probe laser beam 426 to the detector 412 that is situated outside the ultra-high vacuum chamber.

The optical arrangement 40 may further comprise an illumination source 498. The illumination source 498 may be a ring light that is configured to surround the microscope objective 406 and provide light to the sample 422 for imaging with the imaging system 420.

FIG. 12 is a flowchart of an example method 1400, in accordance with various embodiments of the disclosure. At least a portion of method 1400 may be performed, in some examples, by a device or system, such as the optical arrangements shown in FIG. 7 or 11, or another device or system. Although illustrated as discrete blocks, various blocks may be divided into additional blocks, combined into fewer blocks, or eliminated, depending on the desired implementation.

At block 1402, a location of an object (e.g., a sample) may be heated with an excitation laser beam, the excitation laser beam being a continuous-wave laser beam modulated by a square-wave modulation waveform.

At block 1404, a temperature at the location may be measured over time by measuring changes in reflective properties at the location.

Modifications, additions, or omissions may be made to method 1400 without departing from the scope of the disclosure. For example, the operations of method 1400 may be implemented in differing order. Furthermore, the outlined operations and actions are only provided as examples, and some of the operations and actions may be optional, combined into fewer operations and actions, or expanded into additional operations and actions without detracting from the essence of the disclosed example.

FIG. 13 is a flowchart of an example method 1500, in accordance with various embodiments of the disclosure. At least a portion of method 1500 may be performed, in some examples, by a device or system, such as the optical arrangement shown in FIGS. 7 and 11, or another device or system. Although illustrated as discrete blocks, various blocks may be divided into additional blocks, combined into fewer blocks, or eliminated, depending on the desired implementation.

At block 1502, an excitation laser beam and a probe laser beam may be received along a first same path.

At block 1504, a location of an object may be heated with the excitation laser beam. The excitation laser beam may be a continuous-wave laser beam. The excitation laser beam may be modulated by a square-wave modulation waveform.

At block 1506, the location may be illuminated with a probe laser beam. The excitation laser beam and the probe laser beam may arrive at the location along a second same path.

At block 1508, light reflected from the location may be filtered.

At block 1510, light reflected from the location may be measured.

At block 1512, temperature may be measured at the location over time by measuring changes in reflective properties at the location.

At block 1514, a thermal profile of the object may be generated. The thermal profile may be indicative of the temperature of the location over time as the location is heated by the excitation laser beam and as the location cools after being heated by the excitation laser beam.

At block 1516, the location of the object may be characterized based on the thermal profile.

At block 1518, another measurement of the object may be taken at the location. Taking the other measurement may include separating reflected probe laser light from reflected illumination light. Taking the other measurement may include taking the other measurement based on the reflected illumination light.

Modifications, additions, or omissions may be made to method 1500 without departing from the scope of the disclosure. For example, the operations of method 1500 may be implemented in differing order. Furthermore, the outlined operations and actions are only provided as examples, and some of the operations and actions may be optional, combined into fewer operations and actions, or expanded into additional operations and actions without detracting from the essence of the disclosed example.

Other analysis methods for obtaining thermal properties using the above-described optical arrangements and devices may also be used. For example, the thermal transport properties (e.g., thermal diffusivity) of bulk materials may sometimes be measured using laser flash analysis (LFA), which involves machining a sample to have parallel faces, applying a laser (heat) pulse to one face of the sample, and measuring the time-dependent temperature rise on the opposing face.

While LFA may be used to measure bulk and quasi-homogeneous materials, the small length scales and architected nature of some materials such as particles of tristructural isotropic (TRISO) fuel prevent the thermal properties of each individual layer from being resolved using LFA. Other techniques such as the guarded-comparative heat flow technique, where a rod of unknown thermal conductivity is flanked by two rods of known thermal conductivity which are collectively subjected to an applied steady-state heat flux to determine the properties of the unknown rod, have also been applied to some materials, such as graphitic TRISO compacts.

However, such techniques may only be used to determine an effective thermal conductivity which averages over all of the layers of many particles as well as the matrix material. Such macroscopically averaged property measurements preclude the ability to resolve differences in the local thermal properties resulting from the microscopic heterogeneities (e.g., different TRISO layers), which can lead to inaccurate predictions of the material temperatures, such as predictions of fuel kernel temperatures which may lead to inaccurate predictions of material performance, such as fuel performance.

To avoid this, previous efforts to study the thermal properties of material such as TRISO coating layers have employed Raman-based techniques or laser-based thermoreflectance techniques, which offer much finer spatial resolution. Unfortunately, there is substantial scatter in the reported thermal diffusivity and conductivity values, especially in the SiC TRISO layer, whose reported room temperature thermal conductivity varies from 4 W/mK to 168 W/mK and occasionally is omitted from the layers reported on.

Additionally, the anisotropy of the thermal properties within a given pyrolytic carbon layer, given as the ratio between the thermal diffusivity or conductivity in the circumferential versus the radial direction, has been reported to range from 1.01 to more than 40 depending on processing conditions. Unfortunately, most of the thermal property measurements are from studies which examine only a single TRISO particle, and often only a single measurement within one particle from each layer. Moreover, much of the work previously performed has studied TRISO particles of unknown purity or pseudo TRISO particles—particles which feature carbonaceous coatings, but either feature different processing conditions or different layer materials than TRISO particles under consideration and undergoing qualification for nuclear reactor applications. As such, between variations in the processing conditions and the compositions of the materials studied, combined with the limited number of measurements taken, it may be difficult to determine the origin of the scatter in the thermal property data for the different TRISO particle layers.

Accordingly, in some embodiments, the directional thermal transport properties of a material, such as of each TRISO layer, may be directly measured using two laser-based thermoreflectance techniques and compared across multiple particles of known composition or purity. Results from these measurements may be examined in concert with microstructural characterization and Raman spectroscopy to gain understanding into the anisotropy of thermal properties within the material, such as within individual TRISO particles, as well as the consistency of thermal properties at different locations within the material, such as within a single TRISO particle and across multiple TRISO particles. Additionally, a methodology has been developed to map the thermal properties throughout the cross section of a material, such as a TRISO fuel particle, without having a priori knowledge of the underlying material, which can be extended to more general use in the material science community especially for applications involving other architected materials and metamaterials.

To measure the thermal properties of such a material, such as material properties of TRISO layers, two thermoreflectance-based techniques may be employed: spatial-domain thermoreflectance (SDTR) and frequency-domain thermoreflectance (FDTR). Both SDTR and FDTR may employ a pump-probe setup, similar to that described above with reference to FIGS. 7 and 11. In some embodiments, a 660-nm wavelength laser may impinge on the surface of the sample with its amplitude modulated by a periodic wave form (e.g., a sinewave, a square wave, etc.), using, for example, a function generator, to locally heat the sample and produce a three-dimensional thermal wave within the material. In addition to the heating laser, a 532-nm wavelength laser may be shined onto a surface of the material with an unmodulated (i.e., constant) amplitude as a thermal wave probe. Using a lock-in amplifier, the thermal wave propagation may be monitored by collecting the reflected probe laser beam, of which the periodic portion is a linear function of temperature, also known as the thermoreflectance effect. By comparing the phase delay of the induced thermal wave with respect to the applied heating, information about the thermal transport within the material may be obtained—specifically the thermal diffusivity.

To perform SDTR, the pump or probe laser spot may be moved relative to one another, off of their initial coaxial alignment, which allows the in-plane thermal transport properties to be measured. One benefit of SDTR is that it may enable the measurement of the thermal properties in an arbitrary direction across the surface of the sample which, through multiple measurements, allows the user to map the thermal properties along different vectors from a single point and assess any thermal anisotropy in the underlying material. SDTR, however, may require a relatively larger sampling area, typically spanning about 10-20 μm in one dimension, (since the lasers necessarily must be positioned apart from one another) which limits the spatial resolution of the technique.

To complement SDTR, FDTR may be employed, which keeps the pump and probe beams coaxial as they interrogate the sample. In FDTR, the pump beam may be stepped through multiple modulation frequencies and the phase delay at each frequency may be measured. The phase delays as a function of modulation frequency may then be fit to a thermal-wave model to fit the out-of-plane thermal properties. FDTR may thus be used to interrogate a smaller volume by eliminating displacement of the lasers relative to one another. FDTR may be performed relatively faster than SDTR at the cost of collecting information on thermal property anisotropy. In some embodiments, a full three-dimensional (3D) thermal-wave model may be utilized via the use of smaller laser spot sizes (~3.3 μm and ~1.3 μm for FDTR and SDTR, respectively) and via consideration of a comparatively smaller measurement domain.

To improve the signal and enable measurements of both thermal conductivities and diffusivities, a coating, such as a gold coating, may be deposited on top of a sample to be examined, such as on polished TRISO-Ni compact surface using a sputter coater. While other materials besides gold may be used for coating the sample, gold may comprise an appropriate thermoreflectance coefficient when used with a 532-nm wavelength laser and may have a higher melting point than aluminum. Other materials may be used based on a desired wavelength of the laser. For example, aluminum may be used for thermoreflectance measurements using 800-nm wavelength lasers. Additionally, if the thickness, thermal conductivity, and heat capacity of the coating are known, as well as the volumetric heat capacity of the underlying material, then for a fixed pump beam modulation frequency, there is a unique thermal wave phase delay for a given thermal diffusivity value. A lookup table may be generated to convert measured phase delay to thermal diffusivity for a given experimental setup, enabling the rapid mapping of thermal diffusivity using only a single modulation frequency. This may reduce the FDTR thermal diffusivity measurement time to about 1 second per location or less. In some embodiments, the modulation frequency may be approximately 40 kHz and the gold thickness may be approximately 50 nm.

An example of determining properties of gold as a coating material is provided. To determine the properties of the deposited gold film to aid in generating the lookup table, a 2-mm-thick, transparent piece of borosilicate glass (BK7) may be coated simultaneously with the TRISO-Ni compact. The thickness of the gold film may be determined by measuring the attenuation of a 532-nm laser beam through the gold-coated BK7 and solving the Beer-Lambert law, with indices of refraction taken from literature, and may be 53±3 nm. The thermal conductivity of the gold film may be measured by performing SDTR measurements on the gold-coated BK7, the underlying substrate of which has known thermal properties. The measured thermal conductivity of the gold film may be 195±5 W/m·K, which can be used to solve for the thermal diffusivity, given the volumetric heat capacity of gold from literature, through the following equation:

$$D = \frac{k}{\rho C_p} \tag{13}$$

Here, D is the thermal diffusivity in m2/s, k is the thermal conductivity in W/m·K, and $\rho C_P$ is the volumetric heat capacity in J/m3·K. Generating a lookup table to relate phase delay to thermal diffusivity utilizes a known volumetric heat capacity of the underlying material. In some materials, an approximated value may be used. For example, there are many known volumetric heat capacities of the materials making up a TRISO-Ni compact (e.g., YSZ, carbon, SiC, Ni). Accordingly, a single value may be chosen which can reasonably apply to all materials considered. The volumetric heat capacity of nearly all solid materials falls between ~1-5·10$^6$ J/m3·K, with most clustered around 3·10$^6$ J/m3·K at room temperature, and only gradually increases in magnitude as temperature increases. Thus, it has been found that a single value approximation may be beneficial for use with all solid materials, and thus only a single modulation frequency may be used, significantly decreasing time required to map thermal properties of a given material. For example, a dwell time of 1.5 seconds or less may be all that is required to obtain thermal properties at a given location of the material. In one example, 3·106 J/m3·K may be selected as a baseline volumetric heat capacity to enable mapping the thermal properties using FDTR in a way that is independent of the underlying material. Thermal property mapping may be performed under vacuum from about room temperature up to about 1000° C., in 100-° C. increments, using a heating stage. The vacuum level for measurements taken at 700° C. and below may be maintained at ~1·10−5 ton, while the turbomolecular pump may be throttled and the heating stage may be backfilled with argon to produce vacuum levels of ~1·10−4 torr, ~1·10−3 torr, and ~1·10−2 ton at 800° C., 900° C., and 1000° C., respectively, to minimize sublimation of the gold film at high temperatures due to its elevated vapor pressure.

To determine how thermal properties of a material vary as a function of temperature, a series of FDTR measurements may be conducted on a cross section of material. In some embodiments, a single modulation frequency, such as 40 kHz, may be used for the pump beam. Phase delay of the induced thermal wave for a given location may be measured over a predetermined dwell time, such as a 1.5 second dwell time, and correlated to a thermal diffusivity before moving to the next location. By repositioning the location of the measurement in a predetermined pattern, such as a raster pattern, thermal diffusivity may be effectively mapped for a given material. FDTR thermal diffusivity mapping may provide a qualitative assessment of the homogeneity within layers of a material.

While FDTR mapping methodology allows for the thermal diffusivities of multi-material structured to be rapidly mapped without the need for defining the domains of different materials, assumptions utilized to generate the lookup table, namely the assumption of a universal volumetric heat capacity (e.g., 3·106 J/m3·K) for all materials at all temperatures, limit the quantitative accuracy of the technique. However, if the domains of the underlying materials are known—as well as the volumetric heat capacities of those materials at the measurement temperature—the phase delay data may be reprocessed to produce more accurate thermal diffusivity and conductivity values.

Figure 14:
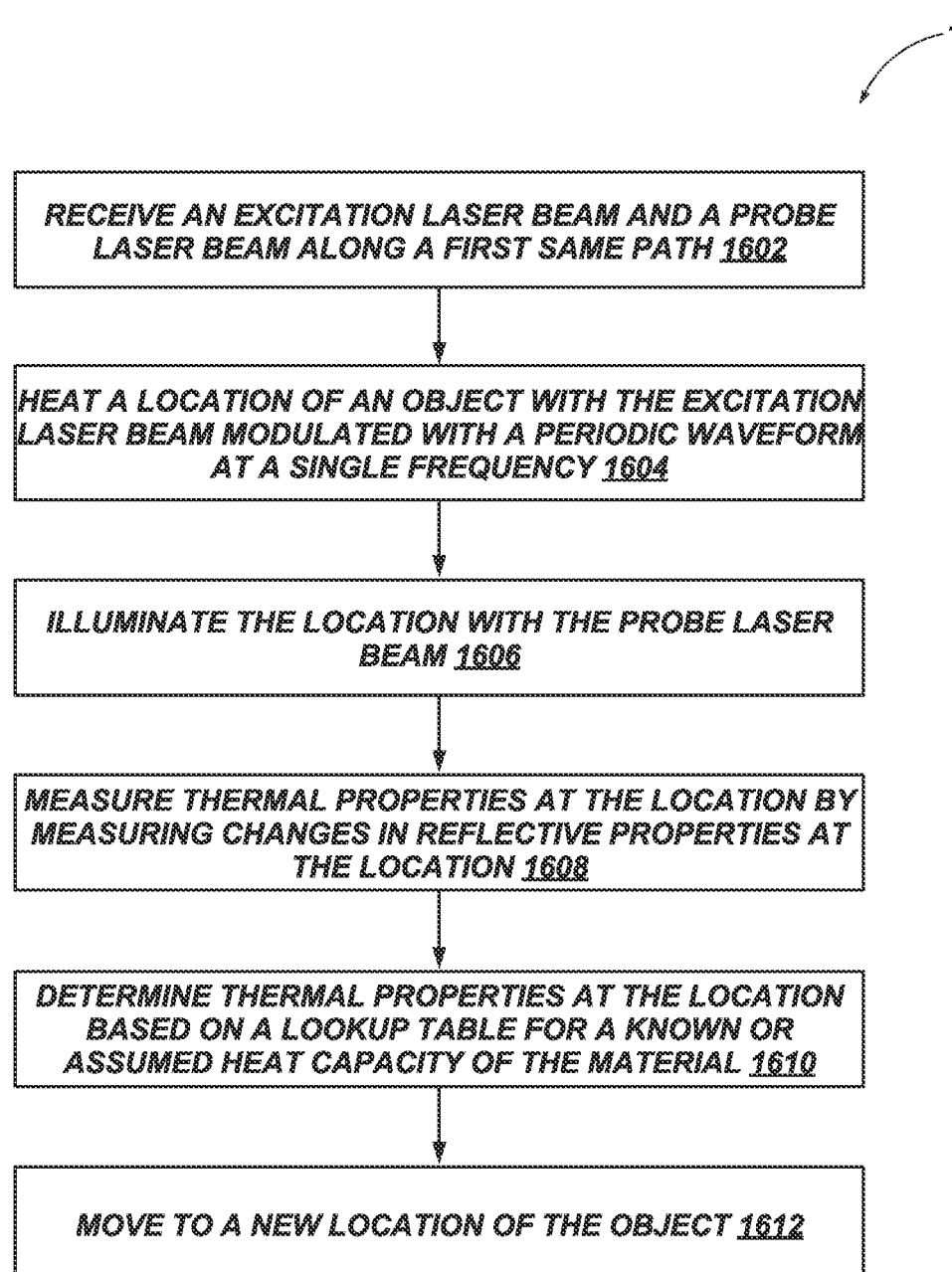
FIG. 14 is a flowchart of another example method, in accordance with various embodiments of the disclosure.

FIG. 14 is a flowchart of an example method 1600, in accordance with various examples of the disclosure. At least a portion of method 1600 may be performed, in some examples, by a device or system, such as the optical arrangement shown in FIGS. 7 and 11, or another device or system. Although illustrated as discrete blocks, various blocks may be divided into additional blocks, combined into fewer blocks, or eliminated, depending on the desired implementation.

At block 1602, an excitation laser beam and a probe laser beam may be received along a first same path.

At block 1604, a location of an object may be heated with the excitation laser beam. The excitation laser beam may be a continuous-wave laser beam. The excitation laser beam may be modulated by a periodic modulation waveform.

At block 1606, the location may be illuminated with the probe laser beam. The excitation laser beam and the probe laser beam may arrive at the location along a second same path.

At block 1608, thermal properties may be measured by measuring changes in reflective properties at the location as discussed above.

At block 1610, thermal properties at the location may be determined based on a lookup table for a known or assumed heat capacity of the material.

At block 1612, a new location of the object may be examined by moving the excitation laser beam and the probe laser beam relative to the object.

In the above method, the thermal properties of the object at the various locations may be quickly mapped because each location may be observed at only a single frequency. Thus, the total time for generating a map of thermal properties of the object may be greatly decreased.

Modifications, additions, or omissions may be made to method 1600 without departing from the scope of the disclosure. For example, the operations of method 1600 may be implemented in differing order. Furthermore, the outlined operations and actions are only provided as examples, and some of the operations and actions may be optional, combined into fewer operations and actions, or expanded into additional operations and actions without detracting from the essence of the disclosed example.

As used in the disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In various examples, the different components, modules, engines, and services described in the disclosure may be implemented as objects or processes that execute on the computing system (e.g., as separate threads). While some of the system and methods described in the disclosure are generally described as being implemented in software (stored on and/or executed by general purpose hardware), specific hardware implementations or a combination of software and specific hardware implementations are also possible and contemplated.

As used in the disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A method comprising:
heating a location of an object with an excitation laser beam, the excitation laser beam being a continuous-wave laser beam modulated by a square-wave modulation waveform; and
measuring temperature at the location over time by measuring changes in one or more reflective properties at the location.

2. The method of claim 1, wherein measuring changes in the one or more reflective properties at the location comprises impinging the location with a probe laser beam and measuring light reflected from the location.

3. The method of claim 2, wherein measuring light reflected from the location comprises filtering light reflected from the location to measure light from the probe laser beam reflected from the location.

4. The method of claim 1, further comprising impinging the location with a probe laser beam, wherein the excitation laser beam and the probe laser beam arrive at the location along a same path.

5. The method of claim 1, further comprising:
receiving the excitation laser beam and a probe laser beam from a single fiber-optic cable; and
impinging the location with the probe laser beam.

6. The method of claim 1, further comprising generating a thermal profile of the object indicative of temperature of the location over time as the location is heated by the excitation laser beam and as the location cools after being heated by the excitation laser beam.

7. The method of claim 6, further comprising characterizing the location of the object based on the thermal profile.

8. The method of claim 1, further comprising, while heating the location, illuminating the object and capturing light reflected from the object at an imaging system.

9. The method of claim 8, wherein capturing the light reflected from the location comprises separating reflected probe light along a path from reflected illuminating light along the path.

10. An apparatus comprising:
a first beam splitter in a first optical path toward an object, the first beam splitter configured to reflect a portion of an excitation laser beam and a portion of a probe laser beam along the first optical path toward the object, the first beam splitter in a second optical path between the object and a detector, the first beam splitter configured to transmit at least a portion of a reflected excitation laser beam, reflected from the object, and at least a portion of a reflected probe laser beam, reflected from the object, along the second optical path; and
an optical filter in the second optical path, the optical filter configured to transmit the reflected probe laser beam along the second optical path toward the detector and to not transmit the reflected excitation laser beam along the second path.

11. The apparatus of claim 10, further comprising:
a second beam splitter in a third optical path between an illumination source and the object, the second beam splitter configured to redirect an illumination beam along the third optical path toward the optical filter, the optical filter configured to redirect the illumination beam along the third optical path toward the first beam splitter;
the first beam splitter configured to transmit at least a portion of the illumination beam toward the object, the first beam splitter in a fourth optical path between the object and an imaging system, the first beam splitter configured to transmit at least a portion of a reflected illumination beam, reflected from the object, along the fourth optical path toward the optical filter;
the optical filter configured to redirect the reflected illumination beam along the fourth path toward the second beam splitter; and
the second beam splitter configured to transmit at least a portion of the reflected illumination beam along the fourth path toward the imaging system.

12. The apparatus of claim 11, further comprising an illumination source configured to provide the illumination beam along the third optical path.

13. The apparatus of claim 11, further comprising one or more lenses in the fourth optical path between the second beam splitter and the imaging system, the one or more lenses configured to focus the reflected illumination beam for the imaging system.

14. The apparatus of claim 11, wherein each of the first optical path, the second optical path, the third optical path, and the fourth optical path is a free-space optical path.

15. The apparatus of claim 10, further comprising a collimator configured to receive the excitation laser beam and the probe laser beam from a fiber-optic cable and direct the excitation laser beam and the probe laser beam along the first optical path between the collimator and the object.

16. The apparatus of claim 10, further comprising a microscope objective in the first optical path between the first beam splitter and the object, the microscope objective configured to focus the excitation laser beam and the probe laser beam onto the object.

17. The apparatus of claim 10, where the optical filter comprises a first optical filter, the apparatus further comprising a second optical filter in the second optical path between the first optical filter and the detector, the second optical filter configured to filter the reflected probe laser beam.

18. The apparatus of claim 10, further comprising the detector configured to receive the reflected probe laser beam.

19. The apparatus of claim 10, further comprising an imaging system comprising a charge-coupled device image sensor.

20. A method comprising:
heating a location of an object with an excitation laser beam modulated with a periodic waveform at a single frequency;
measuring changes in reflective properties at the location of the object; and
determining thermal properties at the location based on a known or assumed heat capacity of a material of the object.

* * * * *